(12) United States Patent
Sethi et al.

(10) Patent No.: US 11,882,004 B1
(45) Date of Patent: Jan. 23, 2024

(54) METHOD AND SYSTEM FOR ADAPTIVE HEALTH DRIVEN NETWORK SLICING BASED DATA MIGRATION

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 17/871,625

(22) Filed: Jul. 22, 2022

(51) Int. Cl.
*G06F 11/00* (2006.01)
*H04L 41/147* (2022.01)
*G06F 3/06* (2006.01)

(52) U.S. Cl.
CPC ............ *H04L 41/147* (2013.01); *G06F 3/067* (2013.01); *G06F 3/0617* (2013.01); *G06F 3/0647* (2013.01); *G06F 11/008* (2013.01)

(58) Field of Classification Search
CPC .... G06F 3/0617; G06F 3/0647; G06F 3/0677; G06F 11/008; G06F 11/2053; G06F 11/2094; H04L 41/0896; H04L 41/147
See application file for complete search history.

(56) References Cited

U.S. PATENT DOCUMENTS

| | | | |
|---|---|---|---|
| 7,525,749 B2 | 4/2009 | Maejima et al. | |
| 7,590,981 B2 | 9/2009 | Gupta et al. | |
| 7,966,391 B2 | 6/2011 | Anderson et al. | |
| 8,078,448 B1 | 12/2011 | Wohlberg et al. | |

(Continued)

FOREIGN PATENT DOCUMENTS

| | | |
|---|---|---|
| CN | 113612635 A | 11/2021 |
| WO | 2017214932 A1 | 12/2017 |

(Continued)

OTHER PUBLICATIONS

Wu, Suzhen et al., Proactive Data Migration for Improved Storage Availability in Large-Scale Data Centers, 2015, IEEE (Year: 2015).*

(Continued)

*Primary Examiner* — Marc Duncan
(74) *Attorney, Agent, or Firm* — Chamberlain, Hrdlicka, White, Williams & Aughtry; Aly Z. Dossa

(57) ABSTRACT

A method for managing data migration includes: obtaining a confidence level of a predicted failure state of a storage component (SC) of a source device; making a first determination that the confidence level exceeds a minimum threshold; making, based on the first determination, a second determination that a high priority network slice of a network exists; mapping data stored in the SC to the high priority network slice; migrating the data to a target device; after migrating the data to the target device: obtaining a confidence level of a predicted failure state of a processing component (PC); making a third determination that the confidence level of the predicted failure state of the PC exceeds a maximum threshold; mapping, based on the third determination, non-migrated data stored in the source device to the high priority network slice; and migrating the non-migrated data to the target device.

20 Claims, 16 Drawing Sheets

(56) References Cited

U.S. PATENT DOCUMENTS

| | | | |
|---|---|---|---|
| 8,364,799 B2* | 1/2013 | Sakai | H04N 21/23 709/224 |
| 9,026,260 B1 | 5/2015 | Thornley et al. | |
| 9,397,930 B2 | 7/2016 | Drobinsky et al. | |
| 9,900,215 B2 | 2/2018 | Yang et al. | |
| 10,785,123 B2 | 9/2020 | Gonguet | |
| 11,424,989 B2 | 8/2022 | Jeuk et al. | |
| 11,588,893 B1 | 2/2023 | Sharma | |
| 11,595,269 B1 | 2/2023 | Ghosh et al. | |
| 2002/0138226 A1 | 9/2002 | Doane | |
| 2005/0216800 A1 | 9/2005 | Bicknell et al. | |
| 2006/0129771 A1* | 6/2006 | Dasgupta | G06F 3/0605 711/162 |
| 2007/0079170 A1* | 4/2007 | Zimmer | G06F 11/008 714/6.23 |
| 2008/0222218 A1* | 9/2008 | Richards | G06F 3/0647 |
| 2011/0113224 A1 | 5/2011 | Isshiki et al. | |
| 2015/0278219 A1 | 10/2015 | Phipps | |
| 2016/0162280 A1 | 6/2016 | Murayama et al. | |
| 2016/0239395 A1 | 8/2016 | Madsen et al. | |
| 2018/0113728 A1 | 4/2018 | Musani et al. | |
| 2018/0262979 A1 | 9/2018 | Wang et al. | |
| 2019/0379595 A1 | 12/2019 | Ur et al. | |
| 2020/0110655 A1 | 4/2020 | Harwood et al. | |
| 2020/0133772 A1* | 4/2020 | Dalmatov | G06F 11/1076 |
| 2020/0156243 A1 | 5/2020 | Ghare et al. | |
| 2021/0153044 A1 | 5/2021 | Ramanathan et al. | |
| 2021/0165768 A1 | 6/2021 | D'halluin et al. | |
| 2022/0070648 A1 | 3/2022 | Krishan | |
| 2022/0138081 A1 | 5/2022 | Varma et al. | |
| 2022/0158926 A1 | 5/2022 | Wennerstrom et al. | |
| 2022/0272142 A1 | 8/2022 | Li et al. | |
| 2022/0283784 A1 | 9/2022 | Degen et al. | |
| 2022/0337493 A1 | 10/2022 | Sant et al. | |
| 2022/0337501 A1 | 10/2022 | Sant et al. | |
| 2022/0368602 A1 | 11/2022 | Adhav et al. | |
| 2023/0033886 A1 | 2/2023 | Goswami et al. | |
| 2023/0037124 A1 | 2/2023 | Mengwasser et al. | |

FOREIGN PATENT DOCUMENTS

| | | |
|---|---|---|
| WO | 2021122516 A1 | 6/2021 |
| WO | 2022104396 A1 | 5/2022 |

OTHER PUBLICATIONS

Suzhen Wu et al., "Proactive Data Migration for Improved Storage Availability in Large-Scale Dat Centers", IEEE Transactions on Computers, vol. 64, No. 9, Sep. 2015 (15 pages).

* cited by examiner

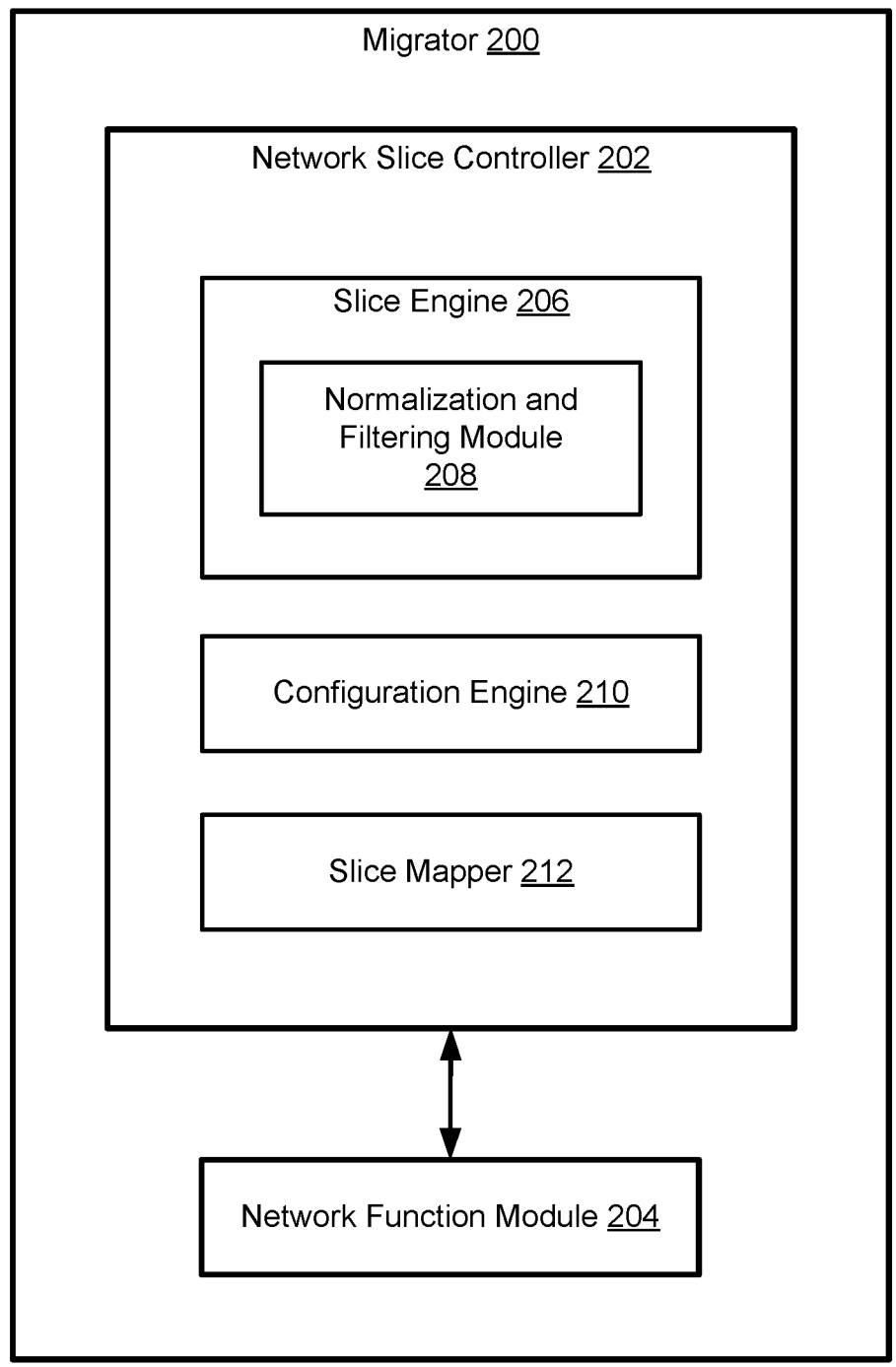
FIG. 2.1

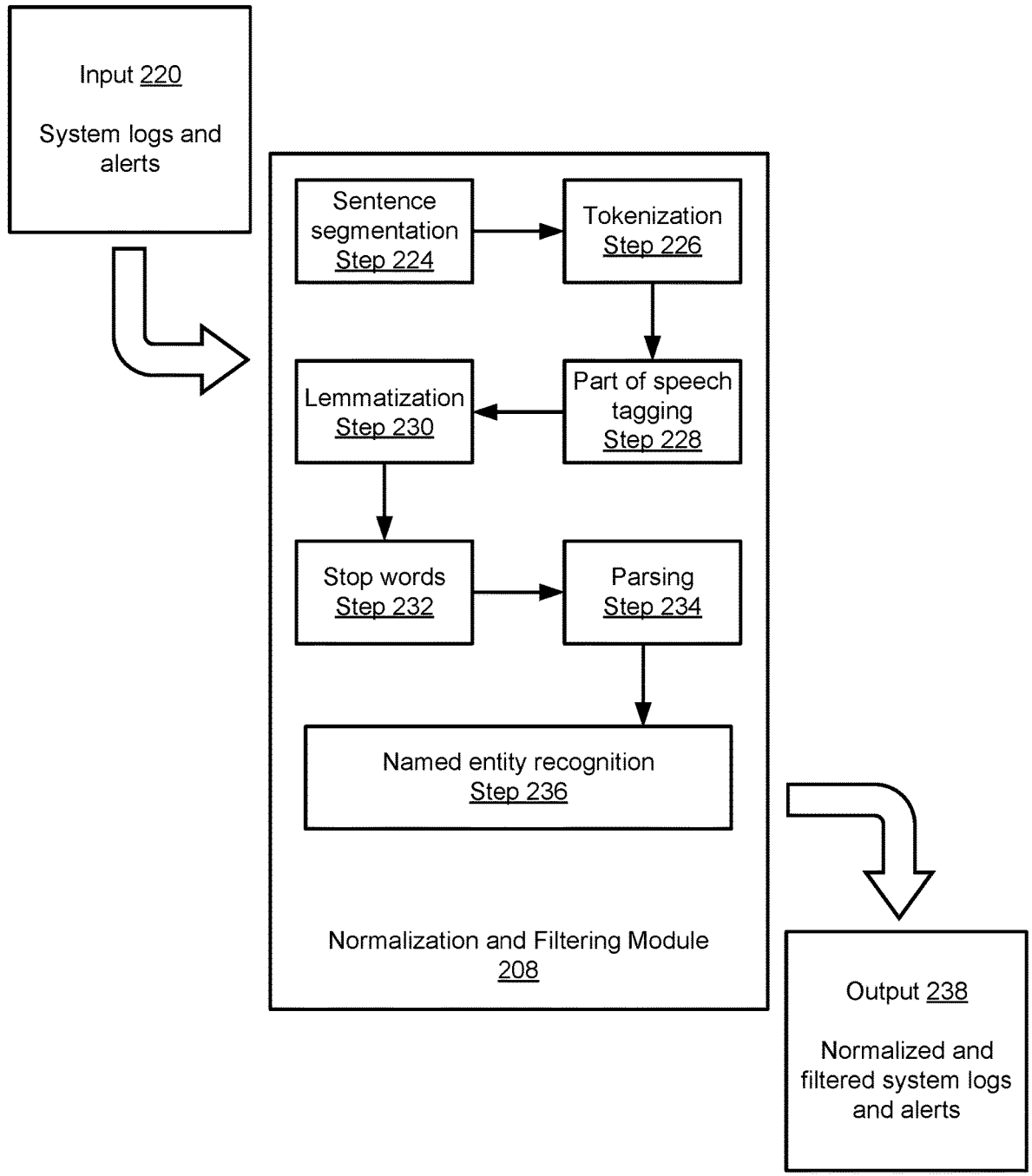
FIG. 2.2

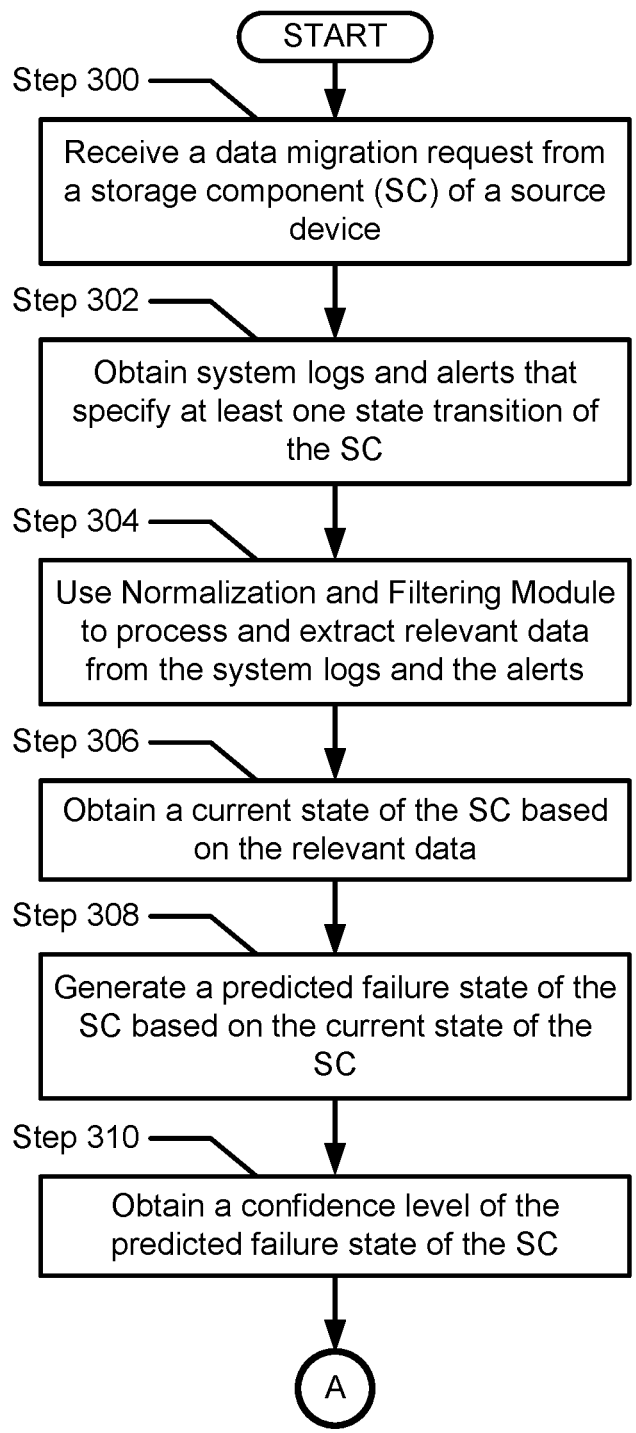
FIG. 3.1

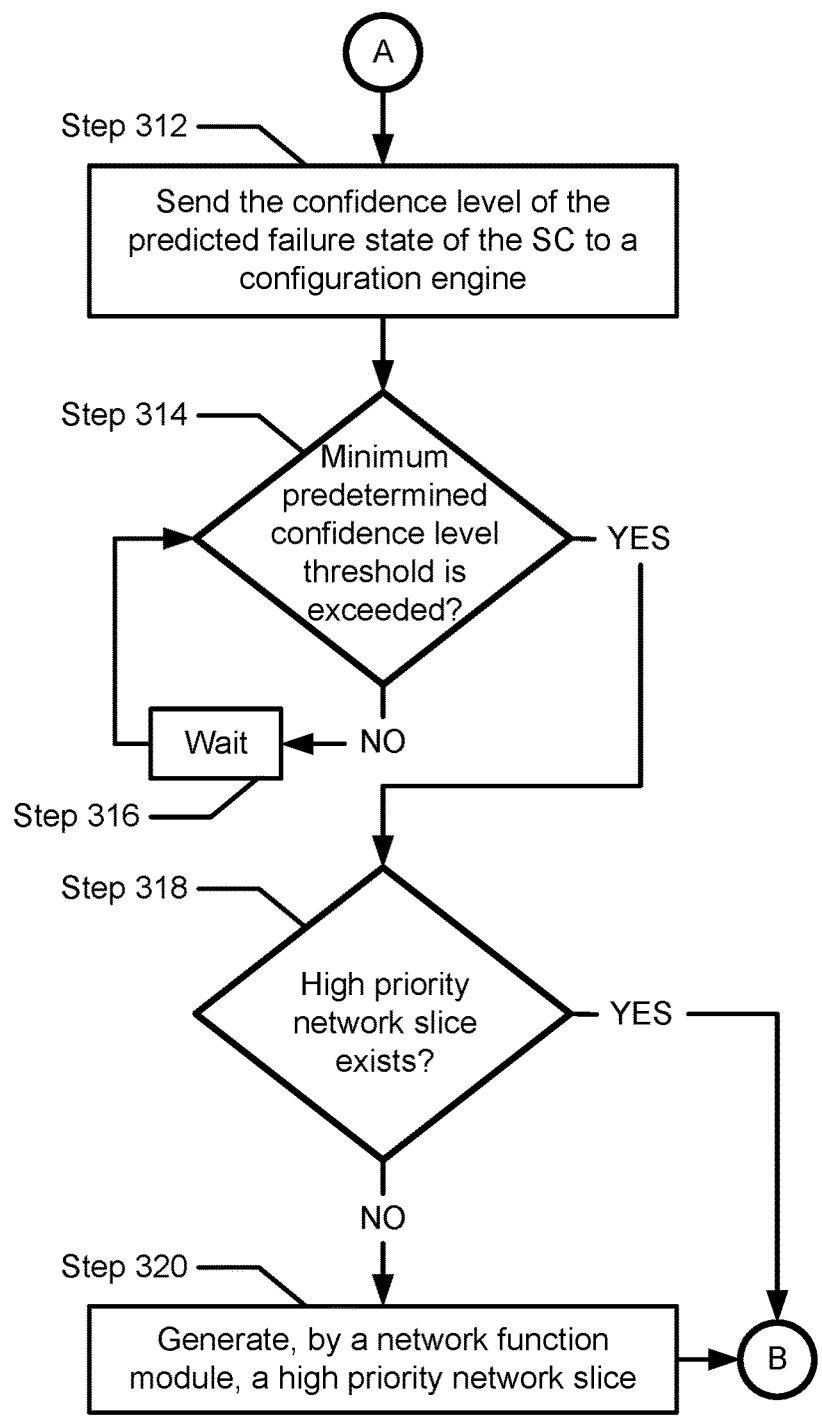
FIG. 3.2

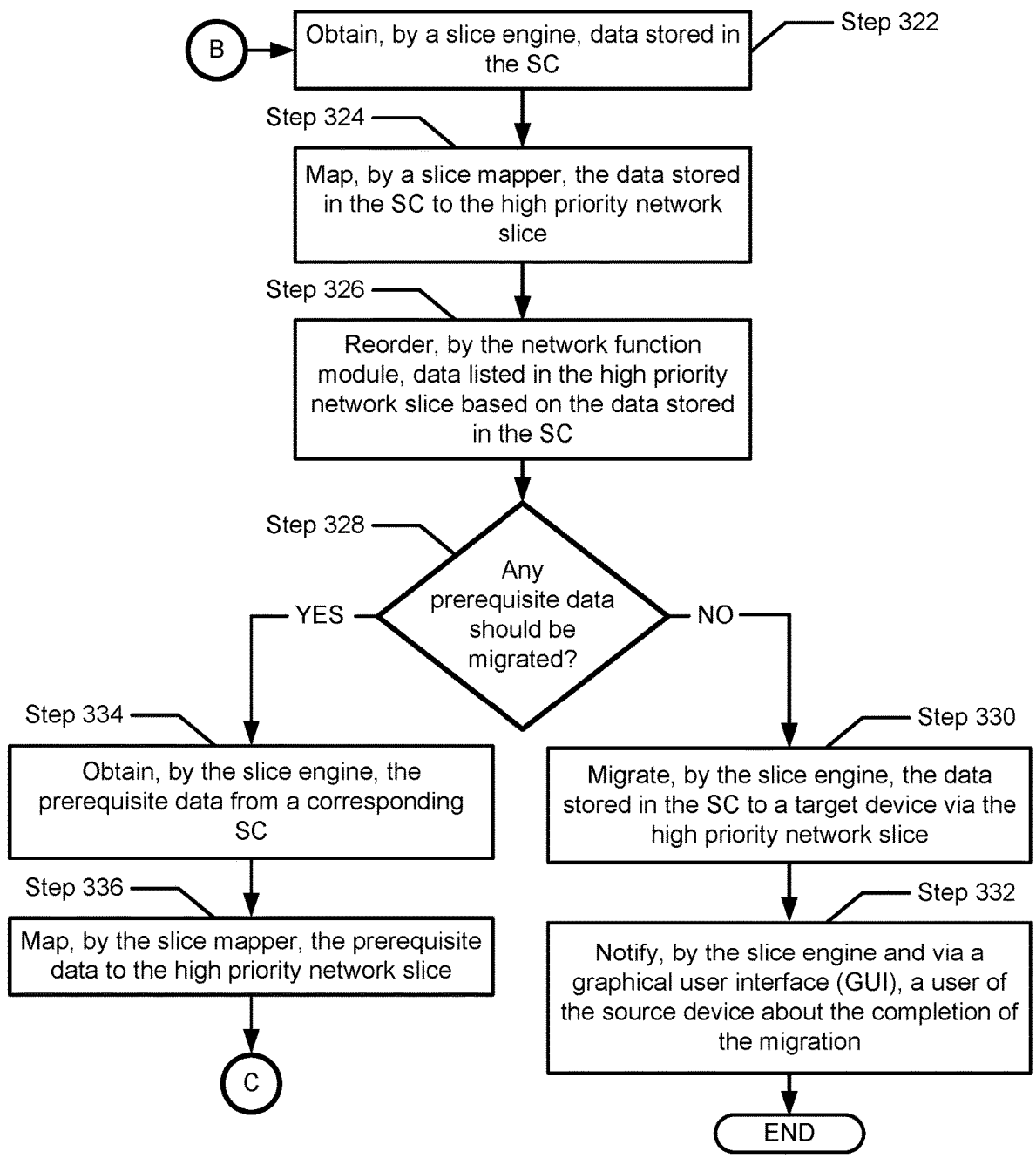
FIG. 3.3

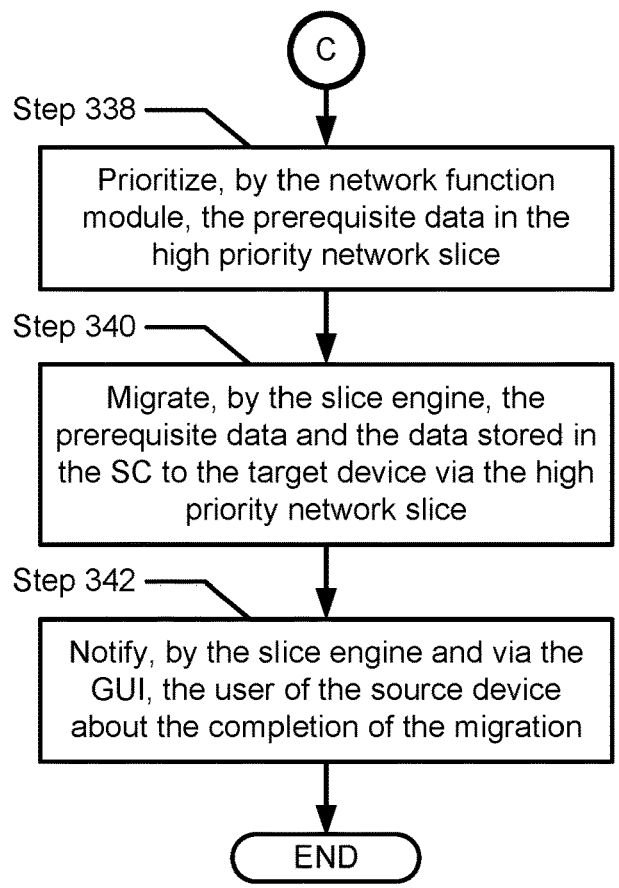
FIG. 3.4

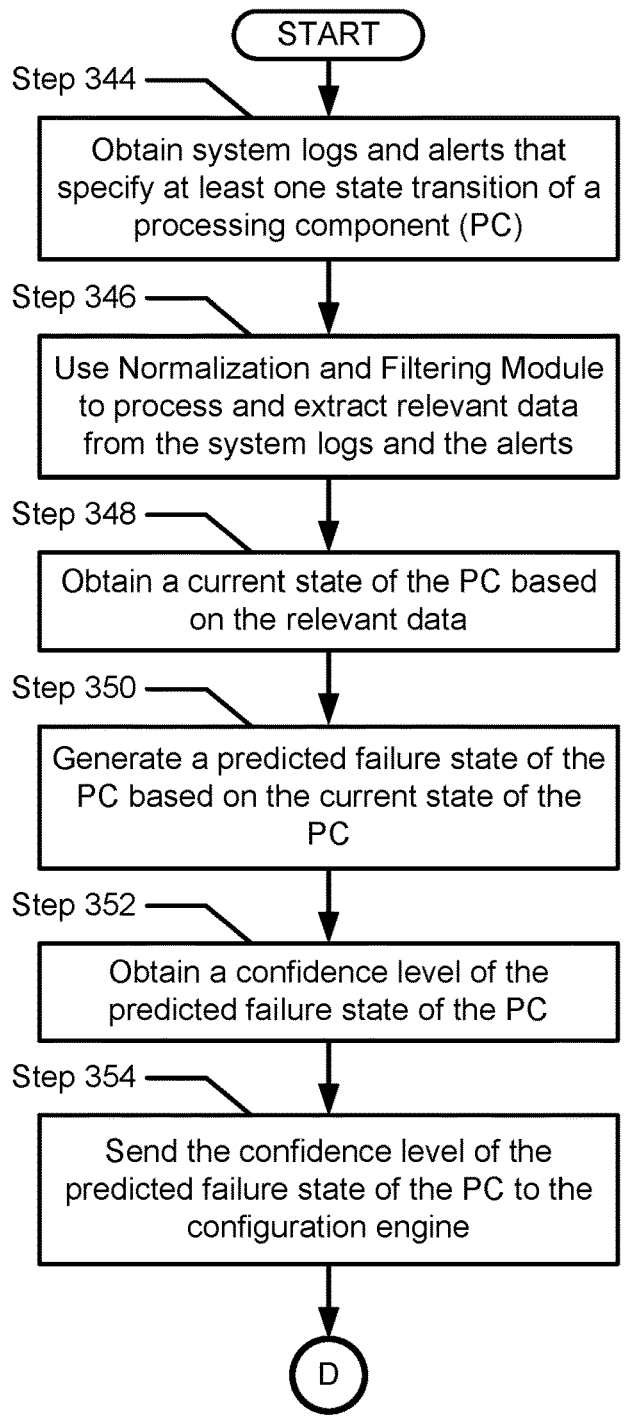
FIG. 3.5

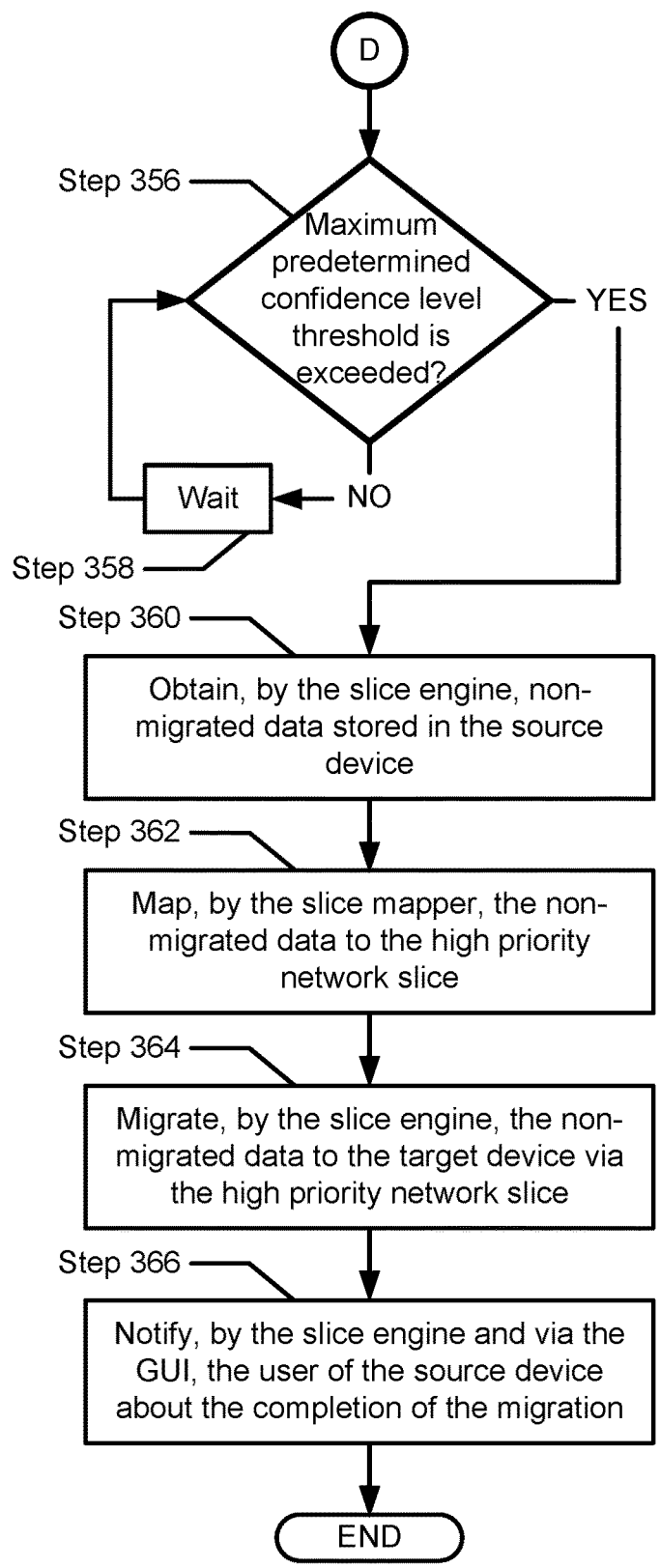
FIG. 3.6

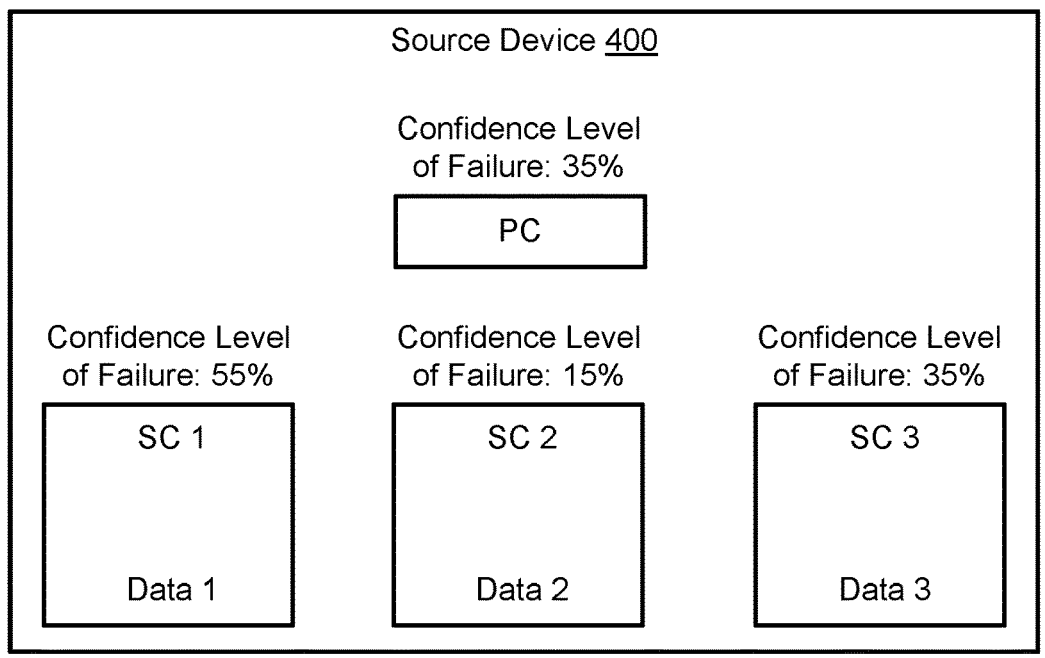
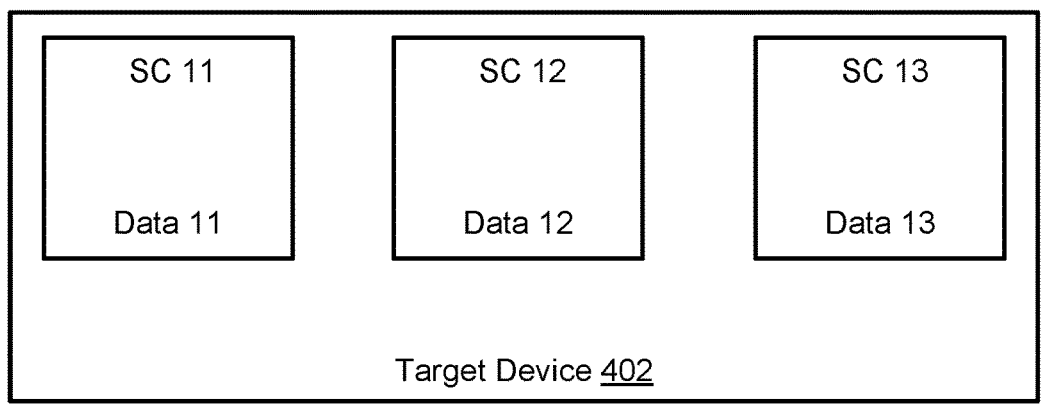
FIG. 4.1

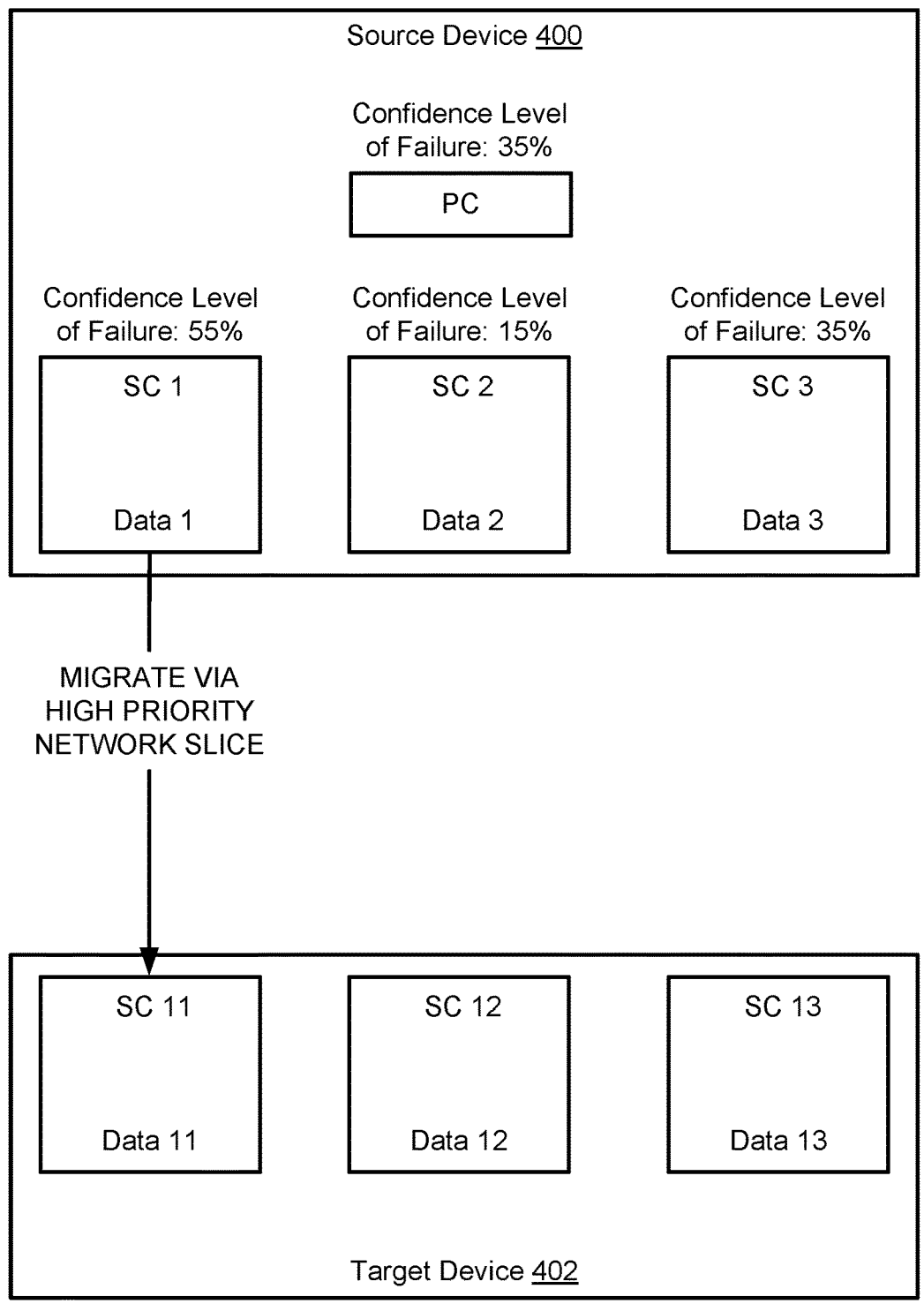
FIG. 4.2

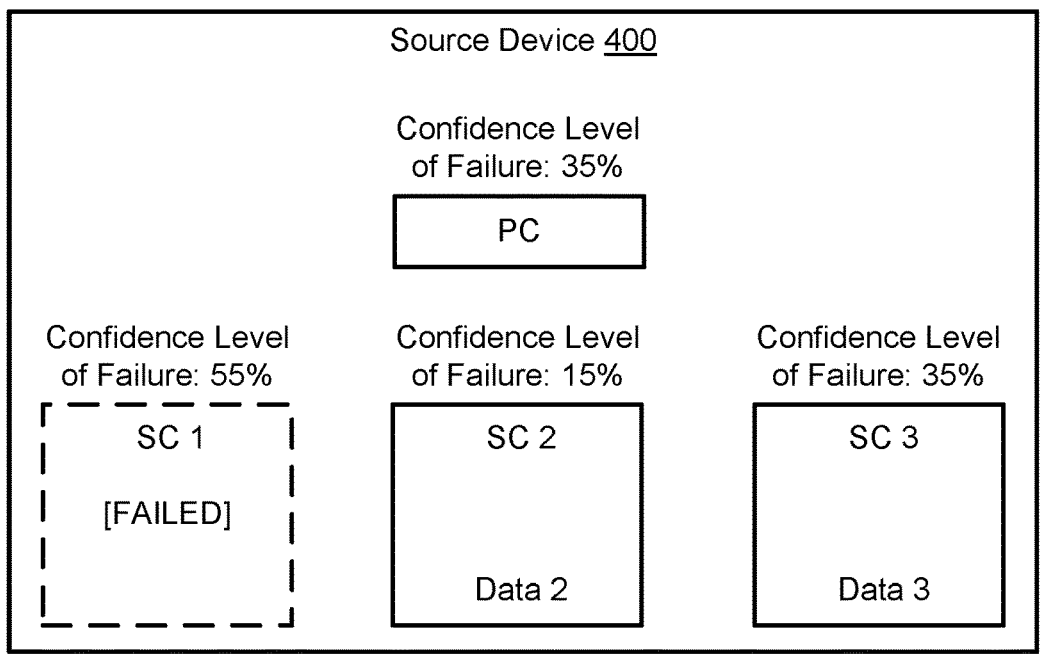
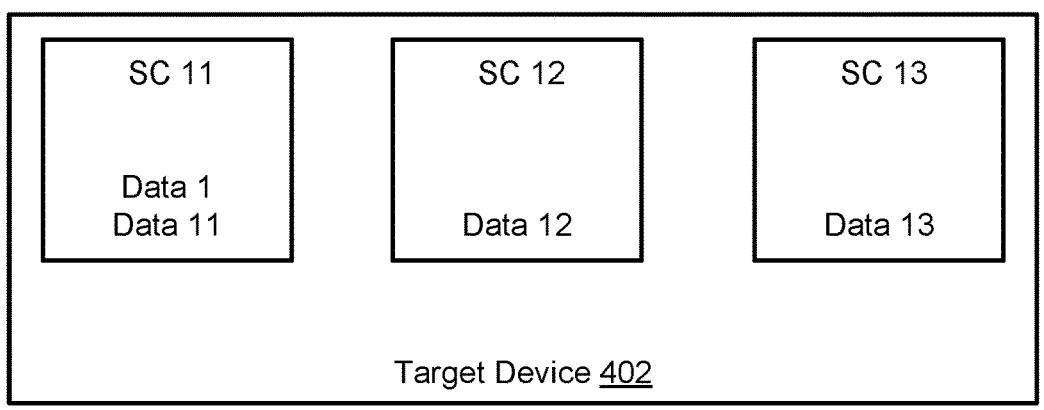
FIG. 4.3

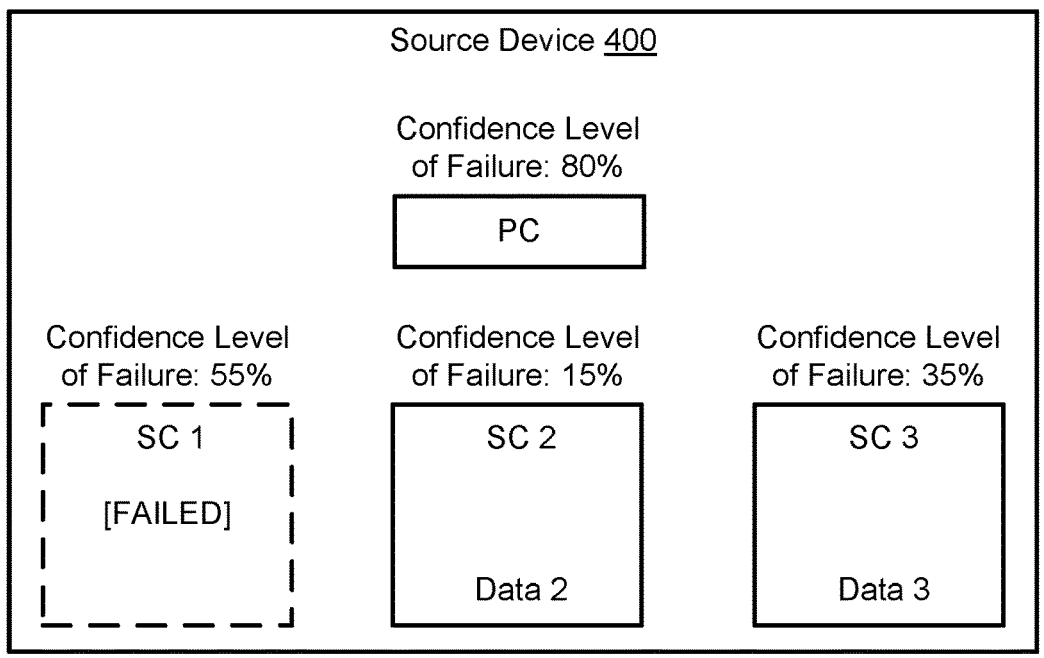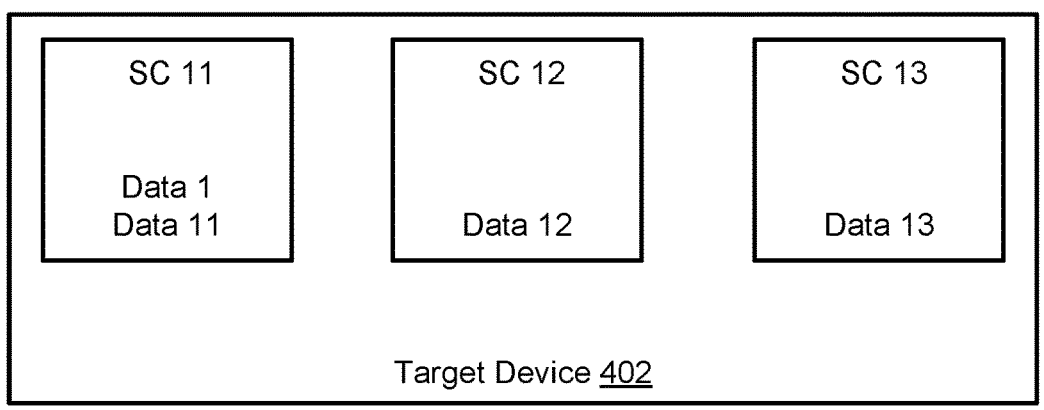
FIG. 4.4

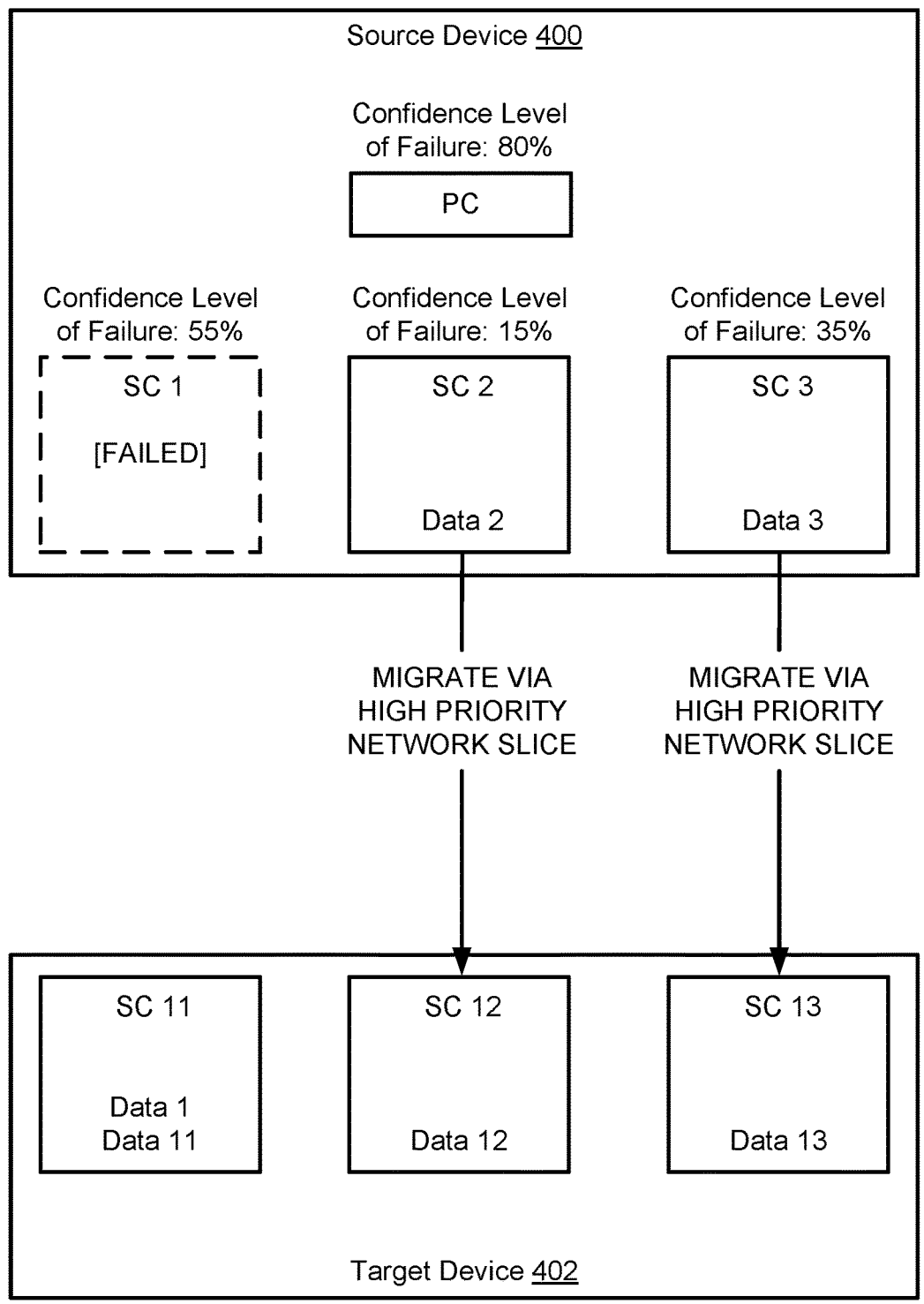
FIG. 4.5

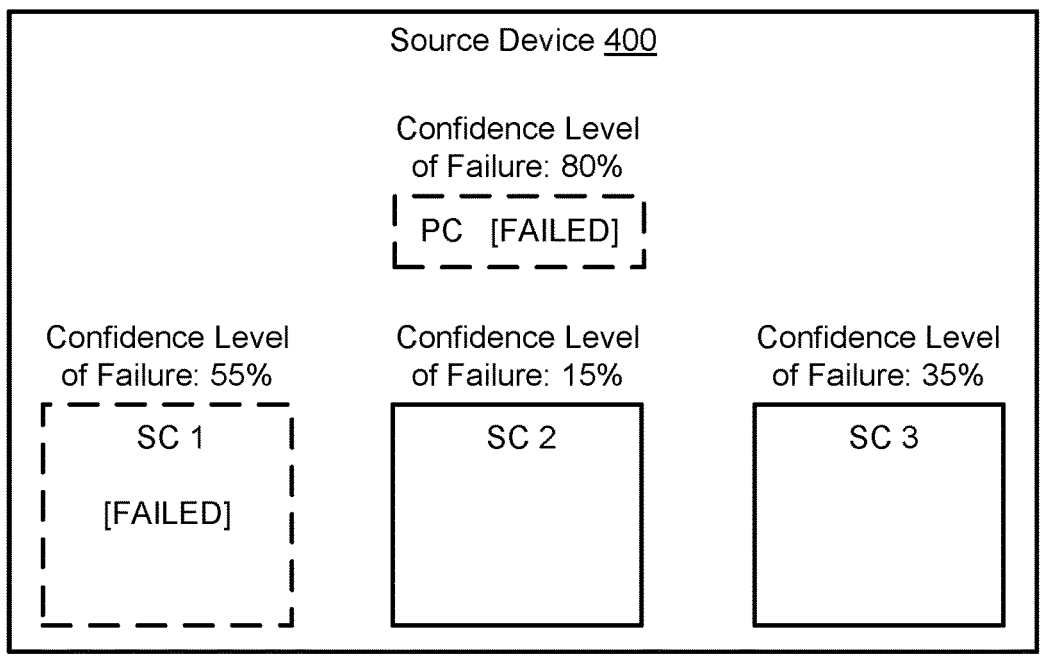
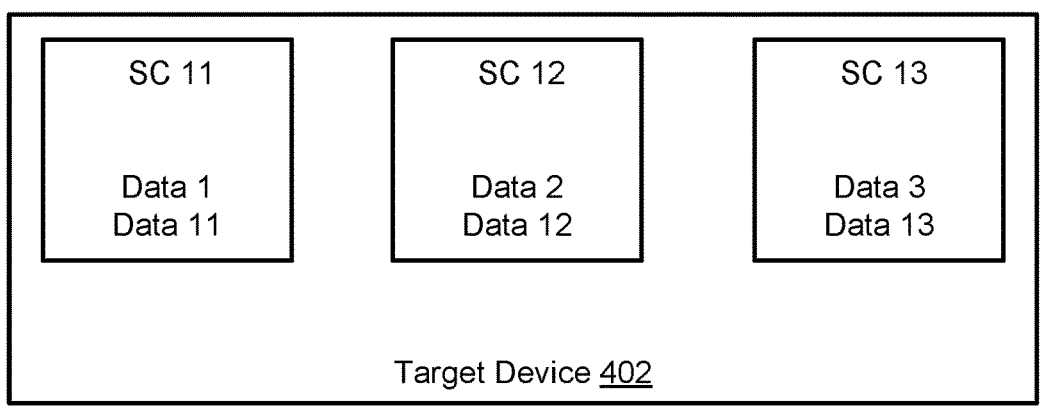
FIG. 4.6

METHOD AND SYSTEM FOR ADAPTIVE HEALTH DRIVEN NETWORK SLICING BASED DATA MIGRATION

BACKGROUND

Computing devices in a system may include any number of internal components such as processors, memory, and persistent storage. Computing resources associated with (e.g., used by) each of these internal components may be used to generate, store, and migrate data. Such utilization of computing resources may affect the overall performance of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 2.1 shows a diagram of a migrator in accordance with one or more embodiments of the invention.

FIG. 2.2 shows a diagram of a normalization and filtering module and a flowchart about the operation of the normalization and filtering module in accordance with one or more embodiments of the invention.

FIGS. 3.1-3.6 show a method for executing a data migration process using network slicing in accordance with one or more embodiments of the invention.

FIGS. 4.1-4.6 show a diagram of an example source device and an example target device during a data migration process in accordance with one or more embodiments of the invention.

DETAILED DESCRIPTION

Figure 1:
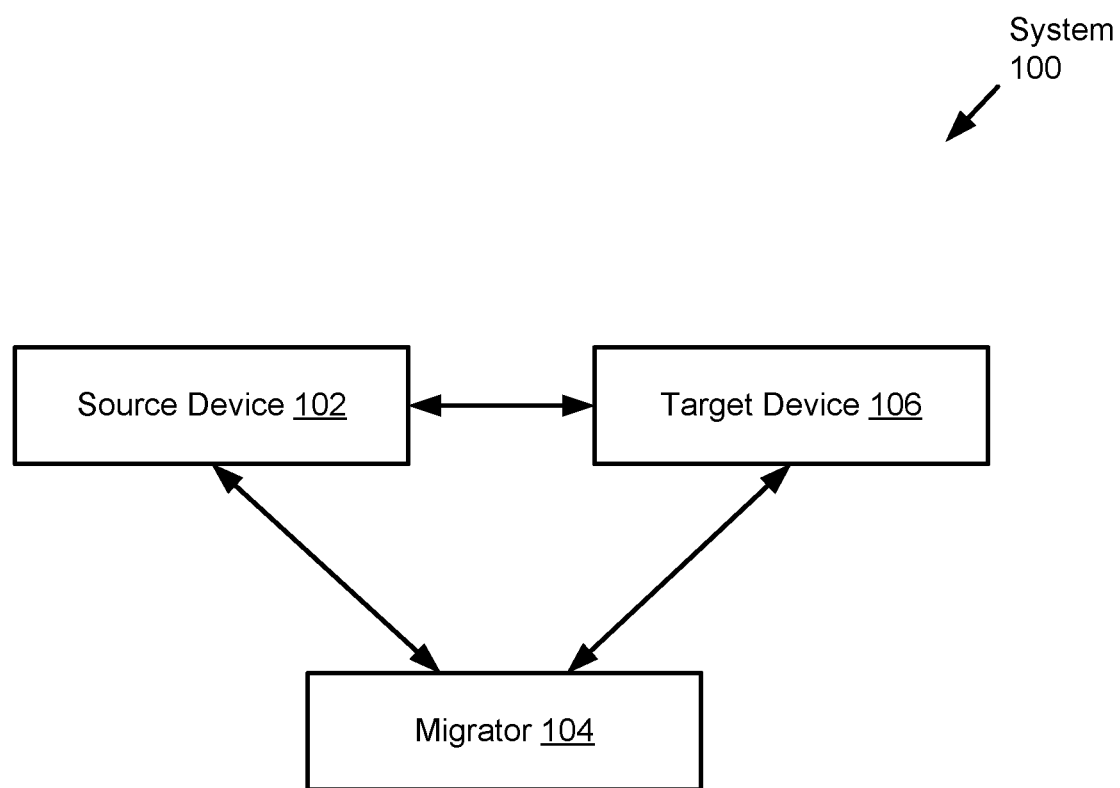
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, when a data migration process is being executed, a source device (e.g., computing device) may not prioritize a high priority (e.g., an urgent) data migration process. As a result of not prioritizing the urgent data migration process, a user of the computing device may experience performance degradation in production workloads (e.g., reading data from a table, writing data to the table, etc.). Embodiments of the invention relate to methods and systems for prioritizing an urgent data migration process using network slicing. More specifically, various embodiments of the invention may obtain a confidence level of a predicted failure state of a storage component (SC) of a source device. After obtaining the confidence level of the predicted failure state of the SC, a first determination may be made to verify that the confidence level of the predicted failure state of the SC exceeds a minimum predetermined confidence level threshold. Based on the first determination, a second determination may be made to verify that a high priority network slice of a network exists. Based on the second determination, data stored in the SC may be mapped to the high priority network slice. After mapping the data stored in the SC to the high priority network slice, data in the high priority network slice may be reordered to prioritize the data stored in the SC. Thereafter, the data stored in the SC may be migrated, via the high priority network slice, to a target device.

At some later point in time, a confidence level of a predicted failure state of a processing component (PC) may be obtained. After obtaining the confidence level of the predicted failure state of the PC, a third determination may be made to verify that the confidence level of the predicted failure state of the PC exceeds a maximum predetermined confidence level threshold. Based on the third determination, non-migrated data stored in the source device may be mapped to the high priority network slice. Finally, the non-migrated data may be migrated, via the high priority network slice, to the target device. As a result of these processes, one or more embodiments disclosed herein advantageously ensure that the urgent data migration process is prioritized. In this manner, the user may experience less performance degradation during production workloads.

The following describes various embodiments of the invention.

FIG. 1 shows a diagram of a system (100) in accordance with one or more embodiments of the invention. The system (100) includes a source device (102), a migrator (104), and a target device (106). The system (100) may include additional, fewer, and/or different components without departing from scope of the invention. Each component may be operably connected to any of the other components via any combination of wired and/or wireless connections. Each component illustrated in FIG. 1 is discussed below.

In one or more embodiments of the invention, the source device (102), the migrator (104), and the target device (106) may be physical or logical devices, as discussed below. In one or more embodiments, the system (100) may include any number of source devices and any number of target devices without departing from the scope of the invention. In one or more embodiments, the source devices may collectively be referred to as a source environment. Similarly, in one or more embodiments, the target devices may collectively be referred to as a target environment.

In one or more embodiments of the invention, the source device (102) may include one or more applications (not shown). The applications may be designed and configured to perform one or more operations (e.g., functions, tasks, activities) instantiated by a user of the source device (102). Examples of the applications may include, but are not limited to: a word processor, a media player, a web browser, a file viewer, an image editor, etc.

In one or more embodiments of the invention, while performing these operations, the applications may include functionality to request and use resources (e.g., processors, memory, network bandwidth, etc.) of the source device (102). The applications may perform other types of functionalities not listed above without departing from the scope of the invention.

In one or more embodiments of the invention, the applications may be implemented as computer instructions, e.g., computer code, stored in persistent storage that when executed by a processor(s) of a computing device cause the computing device (e.g., 500, FIG. 5) to provide the functionality of the applications described throughout this application.

In one or more embodiments of the invention, the source device (102) may include a storage array (e.g., a network-attached storage (NAS) array). The storage array may be a collection of one or more physical storage devices (e.g., storage components (SCs)), in which various forms of data (i.e., information) may be consolidated. The various forms of data may include, but are not limited to: application data, user data, snapshot data, etc. Each SC may include non-transitory computer readable storage media, in which all or some of the data may be temporarily or permanently stored. Additionally, the SCs may or may not be of the same type or located at the same physical location.

In one or more embodiments of the invention, the storage array may host a database (or any logical container) to and from which the data may be stored and retrieved, respectively. The database may occupy a portion of an SC or, alternatively, may span across multiple SCs.

In one or more embodiments, the application data may include, but is not limited to: a list of instructions, one or more application logs, etc. In one or more embodiments, the user data may refer to a composite of various database objects including, but not limited to: one or more recovery catalogs, one or more data files, one or more control files, one or more archive log files, etc. Each of these database objects is described below.

In one or more embodiments, a recovery catalog may be a database object that stores metadata of a backup process (also referred to herein as "backup metadata"). The recovery catalog may include entries for one or more backup processes. The entries may include backup metadata that specify information regarding successfully backed up data files from one or more previously executed backup processes. For example, the backup metadata may include, but is not limited to: data file identifiers, data file storage locations, etc.

In one or more embodiments, a data file may be a database object that stores database data. The database data may include computer readable content (e.g., text, image, video, audio, machine code, any other form of computer readable content, or a combination thereof) that may be generated, interpreted, and/or processed by an application.

In one or more embodiments, the data file may store database data in: (i) an undeduplicated form, or (ii) a deduplicated form. Briefly, the deduplicated form of the database data may be generated through the application of data deduplication on the undeduplicated form of the database data. That is, undeduplicated database data may include computer readable content that may or may not entail redundant information. In contrast, deduplicated database data may result from the elimination of any redundant information analyzed throughout an undeduplicated computer readable content.

In one or more embodiments, the deduplication database may reflect a content recipe of the undeduplicated computer readable content. A content recipe may be a sequence of chunk identifiers (or pointers) of (or directed to) unique database data chunks consolidated in the SCs. The sequence of chunk identifiers (as a representative of the deduplicated database data) may be used to reconstruct the corresponding undeduplicated database data. Additionally, a given chunk identifier for a given database data chunk may include a cryptographic fingerprint or hash of the given database data chunk.

In one or more embodiments, a control file may be a database object that stores database metadata. The database metadata may include information descriptive of the database's status and structure. For example, the database metadata may include, but is not limited to: a database name assigned to the source device (102), name(s) and storage location(s) of one or more data files, a creation timestamp encoding the data, a log sequence number of a current archive log file, etc.

In one or more embodiments, an archive log file may be a database object that stores the history of changes made to the database data. The archive log file may include one or more redo entries (or redo records), which may include a set of change vectors. Each change vector may describe (or represent) a modification made to a subset of the user data (e.g., a single data block of the archive log file). In one or more embodiments, the archive log file may serve to recover the user data should a failover occur, or to apply recent changes to a recovered user data that was recovered during a backup.

In one or more embodiments, the snapshot data may refer to point in time copies of the user data. For example, the snapshot data may include the database objects (discussed above) of the user data at a specific point in time.

In one or more embodiments of the invention, each SC may be designed and configured based on a common or different storage technology—examples of which may include, but are not limited to: flash based storage devices, fibre-channel (FC) based storage devices, serial advanced technology attachment (SATA) storage devices, etc.

In one or more embodiments of the invention, any subset of (or all of) the storage array may be implemented using persistent (i.e., non-volatile) storage. The persistent storage may be a physical computer readable storage medium. For example, the persistent storage may be (or may include) hard disk drives, SSDs, tape drives, or other physical storage media. The persistent storage may be other types of digital storage not listed above without departing from the scope of the invention. Additionally, the persistent storage may be a virtualized storage without departing from the scope of the invention.

In one or more embodiments of the invention, the source device (102) may include one or more processing components (PCs). A PC may be, for example (but is not limited to): a central processing unit (CPU), a graphics processing unit (GPU), a data processing unit (DPU), etc.

In one or more embodiments of the invention, the CPU may refer to an electronic circuitry that may execute operations specified by an application. More specifically, the CPU may perform an operation in three steps: (i) fetching instructions related to the operation from memory, (ii) analyzing the fetched instructions, and (iii) performing the operation based on the analysis. In one or more embodiments, the operation may include, but is not limited to: basic arithmetic calculations, comparing numbers, performing a function, displaying a video, etc.

In one or more embodiments of the invention, the CPU may include, but is not limited to: 10-core (e.g., an individual processor within the CPU) (with 3.7 GHz clock speed), two channels DDR4 dynamic RAM (DRAM) support, etc. In one or more embodiments, the clock speed may refer to the number of instructions that the CPU is able to handle per second.

In one or more embodiments of the invention, the GPU may refer to an electronic circuitry that may provide parallel data processing capabilities to generate enhanced, real-time graphics and to perform accelerated computing tasks (which is particularly useful for machine learning (ML) operations).

In one or more embodiments of the invention, the GPU may include, but is not limited to: graphics memory controller, video processing engine, graphics and computation engine, etc.

In one or more embodiments of the invention, the DPU may refer to an electronic circuitry that may perform accelerated data processing and optimized data movement data within a data center. In one or more embodiments, the DPU may include, but is not limited to: a high-speed networking interface (e.g., 200 gigabits per second (200 Gbps)), DRAM, a multi-core (e.g., 8-core) CPU, programmable acceleration engines (particularly for ML, security, and telecommunications purposes), etc.

Figure 5:
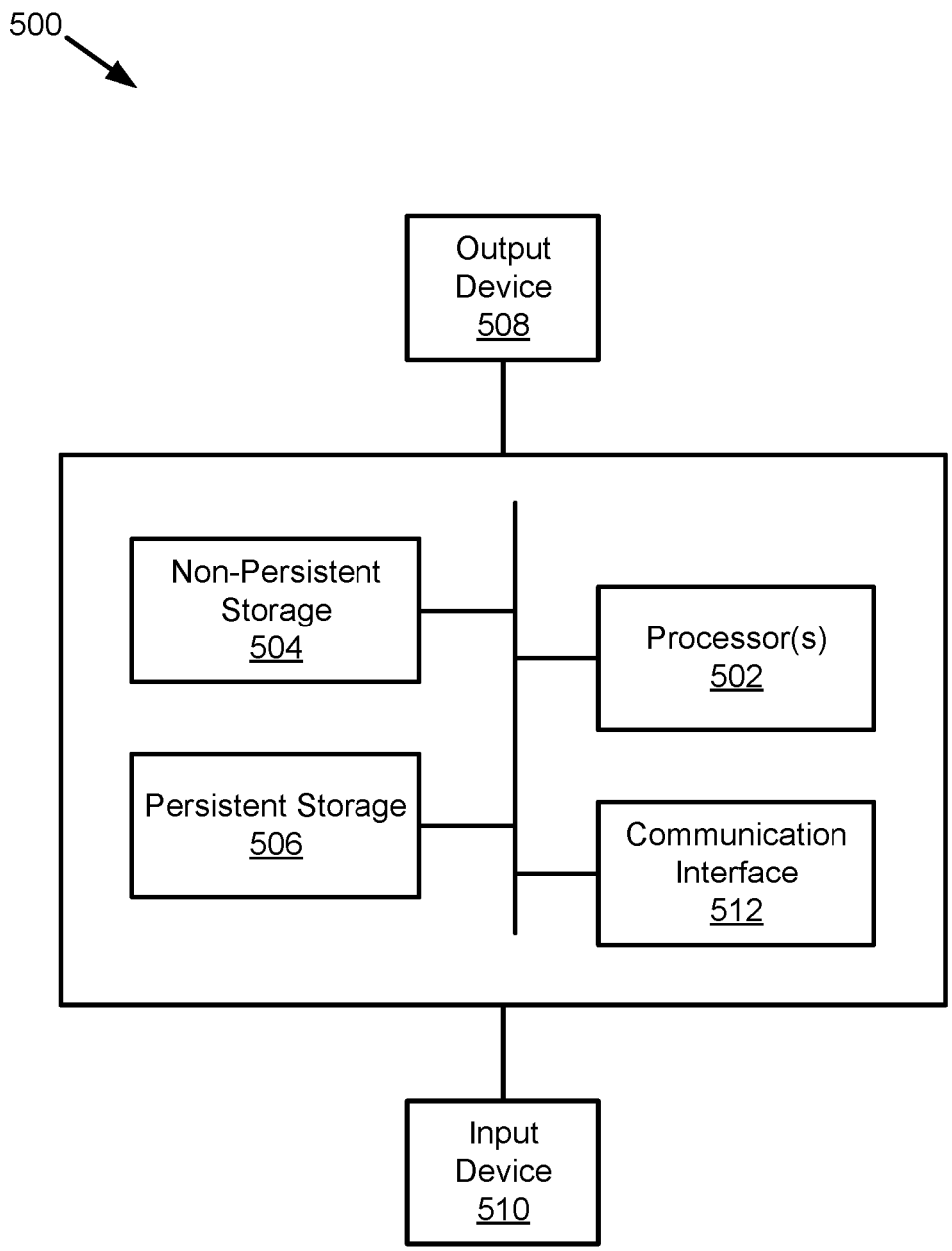
FIG. 5 shows a diagram of a computing device in accordance with one or more embodiments of the invention.

In one or more embodiments of the invention, the source device (102) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors (e.g., CPUs, GPUs, DPUs), memory (e.g., random access memory (RAM)), and persistent storage (e.g., disk drives, solid-state drives (SSDs), etc.). The computing device may include instructions, stored in the persistent storage, that when executed by the processor(s) of the computing device, cause the computing device to perform the functionality of the source device (102) described throughout this application.

Alternatively, in one or more embodiments of the invention, the source device (102) may be implemented as a logical device. The logical device may utilize the computing resources of any number of computing devices to provide the functionality of the source device (102) described throughout this application.

In one or more embodiments of the invention, similar to the source device (102), the target device (106) may include one or more applications. In one or more embodiments, the target device (106) may also include one or more SCs and/or one or more PCs. The SCs may include data that is migrated from the source device (102). The SCs may also include other data without departing from the scope of the invention.

In one or more embodiments of the invention, the target device (106) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the target device (106) described throughout this application.

Alternatively, in one or more embodiments of the invention, similar to the source device (102), the target device (106) may also be implemented as a logical device.

In one or more embodiments of the invention, the migrator (104) is operatively connected to both the source device (102) and the target device (106). The migrator (104) may be located within the source environment, within the target environment, or separate from and connected to both environments.

In one or more embodiments, the migrator (104) may include a slice engine (e.g., 206, FIG. 2.1). The slice engine (e.g., 206, FIG. 2.1) may initiate (e.g., instantiate, execute, etc.) a migration process of the data from the source device (102) to the target device (106). The slice engine (e.g., 206, FIG. 2.1) may initiate the migration process from time to time (e.g., upon request and/or pursuant to a defined schedule). In one or more embodiments, the slice engine (e.g., 206, FIG. 2.1) may monitor the status (e.g., a currently active or completed status) of a migration process that is being executed. The status of the migration process may specify information such as: (i) whether the migration process was successful and whether the migration process was completed within a migration window (e.g., 100% of the migration process was completed), or (ii) whether the migration process was unsuccessful and how much of the migration process was not completed within the migration window (e.g., 80% of the migration process was completed and 20% of the migration process was not completed). In one or more embodiments, the migration window may be a period of time, with a definite start and end, within which a migration process is set to be completed. Additional details of the migration process are described below in reference to FIGS. 3.1-3.6.

In one or more embodiments of the invention, the slice engine (e.g., 206, FIG. 2.1) may include a migration monitoring service for monitoring the status of the migration process. The migration monitoring service may represent a computer program that may execute on the underlying hardware of the migrator (104). Specifically, the migration monitoring service may be designed and configured to facilitate remote access to check the status of and/or to manipulate remotely stored data in the target device (106) during the migration process. Further, the migration monitoring service may include functionality to control remote procedure calls (e.g., application programming interface (API) calls) directed to accessing and manipulating any granularity of the remotely stored data during the migration process.

In one or more embodiments, an API call may refer to a process of an application submitting a request to an API to retrieve the requested data from an external application. An API may represent a collection of methods and procedures (e.g., retrieving information about an API source, updating the API source, etc.) that may be executed by one or more applications in the computing system (e.g., 500, FIG. 5). The collection of methods and procedures may be designed and configured to facilitate the slice engine's (e.g., 206, FIG. 2.1) access to check the status of and/or manipulate remotely stored data.

In one or more embodiments of the invention, when the migration process is completed, the slice engine (e.g., 206, FIG. 2.1) sends a notification (e.g., a completion notification) to the source device (102) regarding the completed migration process. In one or more embodiments, the notification may indicate whether the migration process was completed within a migration window or whether the migration process was completed after exceeding the migration window. Additional details of the components of the migrator (104) are described below in reference to FIG. 2.1.

In one or more embodiments of the invention, the notification generated by the slice engine (e.g., 206, FIG. 2.1) may be displayed on a graphical user interface (GUI). In one or more embodiments, the GUI may be displayed on a display of the computing device (e.g., 500, FIG. 5) using functionalities of a display engine (not shown), in which the display engine is operatively connected to the computing device. The display engine may be implemented using hardware, software, or any combination thereof. The notification generated by the slice engine (e.g., 206, FIG. 2.1) may be displayed in any visual format that would allow the user to easily comprehend (e.g., read and parse) the listed information.

In one or more embodiments of the invention, the migrator (104) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the migrator (104) described throughout this application.

Alternatively, in one or more embodiments of the invention, similar to the source device (102), the migrator (104) may also be implemented as a logical device.

In one or more embodiments of the invention, the source device (102), the migrator (104), and/or the target device (106) may be operatively connected via a network (not shown). In one or more embodiments, the network may include two or more computing devices that are connected via any combination of wired and/or wireless connections. The network may be, for example: a local area network (LAN), a wide area network (WAN), a mobile network, a wireless LAN (WLAN), etc. The network may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, etc.), (ii) being configured by one or more computing devices in the network, and (iii) limiting communication(s) on a granular level (e.g., on a per-port level, on a per-sending device level, etc.).

Turning now to FIG. 2.1, FIG. 2.1 shows a diagram of a migrator (200) in accordance with one or more embodiments of the invention. The migrator (200) may be an example of the migrator (e.g., 104, FIG. 1) discussed above, in which the migrator (e.g., 104, FIG. 1) manages the data migration process. The migrator (200) may include a network slice controller (202) and a network function module (204). The network slice controller (202) may be operably connected to the network function module (204). The network slice controller (202) may include a slice engine (206), a configuration engine (210), and a slice mapper (212). The migrator (200) may include additional, fewer, and/or different components without departing from the scope of the invention. Each component may be operably connected to any of the other component via any combination of wired and/or wireless connections. Each component illustrated in FIG. 2.1 is discussed below.

In one or more embodiments of the invention, the slice engine (206), the configuration engine (210), the slice mapper (212), and the network function module (204) may be physical or logical devices, as discussed below.

In one or more embodiments of the invention, the network slice controller (202) may manage one or more network slices on a shared physical network infrastructure (also referred to herein simply as "network"). For example, the network slice controller (202) may receive data from the source device (e.g., 102, FIG. 1). The network slice controller (202) may determine an appropriate network slice for the data. The network slice controller (202) may then map the data to the appropriate network slice.

In one or more embodiments of the invention, network slicing may be a form of virtual network architecture that enables one or more logical networks to be executed on top of the network. To be able to execute the logical networks on top of the network, the network slicing may use, for example: a software defined networking (SDN) method, a network function virtualization (NFV) method, etc.

In one or more embodiments of the invention, each logical network, referred to as a "network slice", may encompass an end-to-end virtual network with dedicated storage and/or computing resources. In one or more embodiments, each network slice may, for example: implement a set of network functions, be configured to execute a different set of requirements and/or priorities, be associated with a particular Quality of Service (QoS) class, etc.

In one or more embodiments of the invention, the network may include, but is not limited to: a low priority network slice, a normal priority network slice, a high priority network slice, etc. For example, consider a scenario in which the network has the low priority network slice and the high priority network slice. In this scenario, the network may allocate the same amount of bandwidth (BW) to the high priority network slice and to the low priority network slice. If the network supports a 10 Gigabytes per second (GB/s) BW with 5 milliseconds (ms) latency QoS network capacity, the network slice controller (202) may allocate a 5 GB/s BW with 30 ms latency QoS network capacity to each of the network slices.

In one or more embodiments of the invention, a BW of a network slice may refer to a volume of data that can be transmitted over the network slice in a transmission window. The transmission window may be a period of time, with a definite start and end, within which a data transmission is set to be completed.

In one or more embodiments of the invention, to be able to transmit urgent data, the network slice controller (202) may allocate more network capacity to the high priority network slice than the low priority network slice. Using the example discussed above as a reference, the network slice controller (202) may allocate a 7 GB/s BW with 15 ms latency QoS network capacity to the high priority network slice and a 3 GB/s BW with latency QoS network capacity to the low priority network slice.

As yet another example, consider a scenario in which the network has the low priority network slice, the normal priority network slice, and the high priority network slice. In this scenario, based on the example discussed above as a reference, the network slice controller (202) may allocate: (i) a 5 GB/s BW with 25 ms latency QoS network capacity to the high priority network slice, (ii) a 3 GB/s BW with 35 ms latency QoS network capacity to the normal priority network slice, and (iii) a 2 GB/s BW with 50 ms latency QoS network capacity to the low priority network slice.

In one or more embodiments of the invention, the network slice controller (202) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network slice controller (202) described throughout this application.

Alternatively, in one or more embodiments of the invention, similar to the source device (e.g., 102, FIG. 1), the network slice controller (202) may also be implemented as a logical device.

In one or more embodiments of the invention, the network function module (204) may generate the above-mentioned network slices. The network function module (204) may generate a network slice based on a quality of communication over the network requested by the configuration engine (210). In one or more embodiments, the configuration engine (210) may determine the quality of communication based on configuration instructions available in the configuration engine (210).

In one or more embodiments of the invention, the configuration engine (210) may determine the quality of communication by measuring the network's QoS. In one or more embodiments, the QoS may include one or more hardware and/or software components to guarantee the network's ability to transmit urgent data under limited network capacity. The hardware and/or software components operating on the network may accomplish this by implementing differentiated handling (e.g., a networking approach to classify and manage QoS on the network) and capacity allocation. In one or more embodiments, parameters that can be used to measure the QoS may include, but are not limited to: BW, latency, jitter, error rate, etc.

In one or more embodiments of the invention, for a low priority data migration process, the configuration engine (210) may request a low priority network slice that implements a low BW network capacity. Based on receiving the request from the configuration engine (210), the network function module (204) may generate the low priority network slice. In one or more embodiments, the low priority network slice may provide a 2 GB/s BW with 50 ms latency QoS network capacity.

In one or more embodiments of the invention, for a normal priority (e.g., non-urgent) data migration process, the configuration engine (210) may request a normal priority network slice that implements a normal BW network capacity. Based on receiving the request from the configuration engine (210), the network function module (204) may generate the normal priority network slice. In one or more embodiments, the normal priority network slice may provide a 3 GB/s BW with 35 ms latency QoS network capacity.

In one or more embodiments of the invention, for a high priority data migration process, the configuration engine (210) may request a high priority network slice that implements a high BW network capacity. Based on receiving the request from the configuration engine (210), the network function module (204) may generate the high priority network slice. In one or more embodiments, the high priority network slice may provide a 5 GB/s BW with 25 ms latency QoS network capacity.

In one or more embodiments of the invention, the network function module (204) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network function module (204) described throughout this application.

Alternatively, in one or more embodiments of the invention, similar to the source device (e.g., 102, FIG. 1), the network function module (204) may also be implemented as a logical device.

In one or more embodiments, based on receiving a data migration request for data stored in an SC, the slice engine (206) may obtain system logs and alerts from the source device (e.g., 102, FIG. 1). The system logs and alerts may show at least one state transition of the SC. In one or more embodiments, the system logs may specify, for example:

information related to a source device's CPU usage, information related to a newly detected universal serial bus (USB) device, etc.

In one or more embodiments of the invention, the alerts may specify, for example: medium level of CPU overheating, recommended maximum CPU operating temperature is exceeded, etc. An alert may be, for example: a predictive alert, a proactive alert, a technical alert, etc. In one or more embodiments, the alerts may be defined by a vendor of the source device (e.g., 102, FIG. 1), by a technical support specialist, by another entity, or any combination thereof. The alerts may be defined based on a data protection policy.

In one or more embodiments of the invention, the slice engine (206) may make an API call to the source device (e.g., 102, FIG. 1) to obtain the system logs and the alerts. Based on receiving the API call from the slice engine (206), the source device (e.g., 102, FIG. 1) may allow the slice engine (206) to obtain the system logs and the alerts.

In one or more embodiments of the invention, the slice engine (206) may then use a normalization and filtering module (208) to extract relevant data (e.g., SC-related data) from the system logs and the alerts. Additional details of the normalization and filtering module are described below in reference to FIG. 2.2.

In one or more embodiments, based on the relevant data, the slice engine (206) may obtain a current state (e.g., critical, warning, normal, etc.) of the SC. The slice engine (206) may then predict a failure state of the SC based on the current state of the SC using, e.g., a Markov chain model. Thereafter, the slice engine (206) may obtain a confidence level (e.g., a prediction quality) of the predicted failure state using a conformal prediction model. Additional details of the Markov chain model and the conformal prediction model are described below in reference to FIG. 3.1.

In one or more embodiments, based on receiving the data migration request, the slice engine (206) may also obtain application metadata of one or more applications from the source device (e.g., 102, FIG. 1). In one or more embodiments, the data stored in the SC may include application data of the applications. The slice engine (206) may obtain the application metadata to determine application properties of the applications.

In one or more embodiments of the invention, the slice engine (206) may make an API call to the source device (e.g., 102, FIG. 1) to obtain the application metadata. Based on receiving the API call from the slice engine (206), the source device (e.g., 102, FIG. 1) may allow the slice engine (206) to obtain the application metadata. In one or more embodiments, the application metadata may include, but is not limited to: a size of an application, a type of an application, a priority of an application, etc.

In one or more embodiments of the invention, the size (e.g., 5 Megabytes (5 MB), 5 GB, etc.) of the application may specify how much storage of persistent storage will be consumed by the application. In one or more embodiments, the type of the application may specify one or more characteristics of the application. The type of the application may specify, for example, that: the application is a support application, the application is a deployment application, the application is a recycling application, etc.

In one or more embodiments of the invention, the priority of the application may specify a priority class of the application. The priority class may be based on, for example: an application's tolerance for downtime, a size of an application, a relationship (e.g., a dependency) of an application to other applications, etc.

In one or more embodiments of the invention, one or more applications may be classified based on each application's tolerance for downtime. For example, based on the classification, an application may be assigned to one of three classes such as class I, class II, and class III. In one or more embodiments, a class I application may be an application that cannot tolerate downtime. A class II application may be an application that can tolerate a period of downtime (e.g., an hour or other period of time determined by an administrator or a user). A class III application may be an application that can tolerate any amount of downtime.

In one or more embodiments of the invention, the slice engine (206) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the slice engine (206) described throughout this application.

Alternatively, in one or more embodiments of the invention, similar to the source device (e.g., 102, FIG. 1), the slice engine (206) may also be implemented as a logical device.

In one or more embodiments of the invention, the slice engine (206) sends the confidence level of the predicted failure state of the SC and/or the application properties of the applications to the configuration engine (210). In one or more embodiments, the configuration engine (210) may include one or more configuration instructions. Based on the confidence level of the predicted failure state and/or the application properties, the configuration instructions may specify the network slice that the data stored in the SC should be mapped. In one or more embodiments, the configuration instructions may be set by a manufacturer of the configuration engine (210). Alternatively, the configuration instructions may also be set by an administrator or a user of the configuration engine (210).

For example, consider a scenario in which the confidence level of the predicted failure state of the SC is 55%. In this scenario, the configuration engine (210) may determine that the confidence level of the predicted failure state of the SC exceeds a minimum predetermined confidence level threshold (e.g., 50%). In this manner, the configuration instructions may specify that the data (e.g., user data, application data, snapshot data, etc.) stored in the SC should be mapped to the high priority network slice.

As yet another example, consider a scenario in which the confidence level of the predicted state of the SC is 15% and the application properties specify that application data belongs to a class I application. In this scenario, the configuration engine (210) may determine that the confidence level of the predicted failure state of the SC does not exceed the predetermined confidence level threshold. The configuration engine (210) may also determine that the application data belongs to the class I application. In this manner, the configuration instructions may specify that the application data stored in the SC should be mapped to the high priority network slice.

As yet another example, consider a scenario in which the confidence level of the predicted state of the SC is 15% and the application properties specify that application data belongs to a class III application. In this scenario, the configuration engine (210) may determine that the confidence level of the predicted failure state of the SC does not exceed the predetermined confidence level threshold. The configuration engine (210) may also determine that the application data belongs to the class III application. In this manner, the configuration instructions may specify that the application data stored in the SC should be mapped to the low priority network slice. Additional details of the network slice mapping process are described below in reference to FIG. 3.3.

In one or more embodiments of the invention, the configuration engine (210) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the configuration engine (210) described throughout this application.

Alternatively, in one or more embodiments of the invention, similar to the source device (e.g., 102, FIG. 1), the configuration engine (210) may also be implemented as a logical device.

In one or more embodiments of the invention, the configuration engine (210) sends the configuration instructions of the above-discussed scenarios to the slice mapper (212). In one or more embodiments, based on the configuration instructions, the slice mapper (212) may map the data or the application data to a corresponding network slice. For example, based on the configuration instructions, the slice mapper (212) may map the data to the high priority network slice.

In one or more embodiments of the invention, for example, if the slice mapper (212) determines that the network does not include any high priority network slice, the slice mapper (212) may make an API call to the network function module (204) to request the generation of a high priority network slice. In one or more embodiments, based on receiving the API call from the slice mapper (212), the network function module (204) may generate the high priority network slice. The network function module (204) may then notify the slice mapper (212) about the completion of the generation of the high priority network slice. After receiving the notification, the slice mapper (212) may map the data to the high priority network slice.

As yet another example, based on the configuration instructions, the slice mapper (212) may map the application data to the low priority network slice. In one or more embodiments, if a utilization threshold of the low priority network slice is exceeded, the slice mapper (212) may map the application data to the normal priority network slice.

In one or more embodiments of the invention, the network function module (204) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network function module (204) described throughout this application.

Alternatively, in one or more embodiments of the invention, similar to the source device (e.g., 102, FIG. 1), the network function module (204) may also be implemented as a logical device.

Turning now to FIG. 2.2, FIG. 2.2 shows a diagram of a normalization and filtering module (208) and a flowchart about the operation of the normalization and filtering module (208) in accordance with one or more embodiments of the invention. For the sake of brevity, not all components of the normalization and filtering module (208) may be illustrated in FIG. 2.2.

In one or more embodiments of the invention, the normalization and filtering module (208) may receive the system logs and alerts for the SC from the slice engine (e.g., 206, FIG. 2.1) as an input (220). The operation of the normalization and filtering module (208) is explained below.

In Step 224, the normalization and filtering module may break the input (e.g., Washington, D.C., is the capital of the United States of America. It is also home to iconic museums.) into separate sentences (e.g., Washington, D.C., is the capital of the United States of America.).

In Step 226, the normalization and filtering module may execute tokenization (e.g., splitting a sentence into smaller portions, such as individual words and/or terms) of important elements of a target sentence and extraction of a token (i.e., keyword) based on an identified group of words. Based on the example discussed above in Step 224, the normalization and filtering module may break the input into smaller portions as "Washington", "D", ".", "C", ".", ",", "is", "the", "capital" "of", "the", "United", "States", "of", "America", ".".

In Step 228, the normalization and filtering module may determine a part of speech (e.g., noun, adjective, verb, etc.) of each token. In one or more embodiments, understanding the part of speech of each token may be helpful to capture the details of the sentence. To execute a part of the speech tagging process, for example, the normalization and filtering module may implement a pre-trained part of the speech classification model.

In one or more embodiments of the invention, the pre-trained part of the speech classification model may determine the part of speech of each token based on similar words that were identified before. For example, the pre-trained part of the speech classification model may consider "Washington" as a noun and "is" as a verb.

In Step 230, the normalization and filtering module may execute lemmatization (i.e., identifying the most basic form of each word in a sentence) of each token. In one or more embodiments, each token may appear in different forms (e.g., capital, capitals, etc.). By executing lemmatization, for example, the pre-trained part of the speech classification model may understand that "capital" and "capitals" are originated from the same word. In one or more embodiments, the normalization and filtering module may execute the lemmatization according to a look-up table of lemma forms of words based on the words' part of speech.

In Step 232, the normalization and filtering module may flag and filter some words in the input (e.g., Washington, D.C., is the capital of the United States of America.) before executing a statistical analysis. In one or more embodiments, some words (e.g., a, the, and, etc.) may appear more frequently than other words in the input, which may cause a noise while executing the statistical analysis. For this reason, the words that appear more than usual may be tagged as stop words, which may identified based on a list of predetermined stop words.

In Step 234, the normalization and filtering module may execute a parsing process to determine a syntactic structure of a sentence. In one or more embodiments, the parsing process may determine how all the words in the sentence relate to each other by generating a parse tree. The parse tree may assign a single parent word to each word in the sentence, in which a root word of the parse tree is a main verb of the sentence. Additionally, the parsing process may also determine the type of a relationship between the single parent word and the root word. Based on the example discussed above in Step 224, the parse tree specifies "Washington" as the noun and "Washington" has the "be" relationship with "capital".

In Step 236, the normalization and filtering module may execute a named entity recognition process. Based on the example discussed above in Step 224, some of the nouns in the input may indicate real things, for example, "Washington" and "America" indicate physical places. In this manner, the named entity recognition process may be executed to detect and extract a list of real things included in the input. For example, the named entity recognition process may apply a statistical analysis such that the process can distinguish "George Washington", the person, and "Washington", the place, using context clues.

Those skilled in the art will appreciate that while the example discussed above in Step 236 uses physical location as a context clue for the named entity recognition process, any other context clues (e.g., names of events, product names, dates and times, etc.) may be considered to perform the named entity recognition process without departing from the scope of the invention.

Following Step 236, the normalized and filtered input is extracted as an output (238). In one or more embodiments, the output (238) may be the SC-related data. In one or more embodiments, the slice engine (206) may obtain the SC-related data from the normalization and filtering module (208) or the normalization and filtering module (208) may store the SC-related data in storage.

FIGS. 3.1-3.6 show a method for executing a data migration process using network slicing in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed slice engine (e.g., 206, FIG. 2.1). Other components of the system (100) illustrated in FIG. 1 may also execute all or part of the method shown in FIG. 3.1 without departing from the scope of the invention.

In Step 300, the slice engine may receive a data migration request for data stored in one of the SCs of the source device (e.g., 102, FIG. 1). In one or more embodiments, an administrator or a user of the source device sends the request.

In Step 302, based on receiving the request, the slice engine may obtain system logs and alerts from the source device. In one or more embodiments, the system logs and the alerts may specify at least one state transition of the SC. For example, the state transition (e.g., from a healthy state to an unhealthy state) of the SC may specify: operational SC→fan failure→overheating of SC→SC failure. Certain exemplary details of the system logs and the alerts have been described above in reference to FIG. 2.1.

In Step 304, the slice engine may use the normalization and filtering module (e.g., 208, FIG. 2.2) to process and extract SC-related data from the system logs and the alerts. Said another way, the normalization and filtering module may analyze the system logs and the alerts in order to extract data that is relevant to (related to or associated with) one or more SCs, this data may be referred to as "SC-related data". Based on the example discussed above in Step 302, the SC-related data may specify how the operational SC state of the SC is transitioned into the overheating of SC state.

In Step 306, based on the SC-related data, the slice engine may obtain a current state of the SC. Based on the example discussed above in Step 302, the current state of the SC may be that the SC state of "overheating". In one or more embodiments, the current state of the SC may be the state where an SC failure was reported.

In Step 308, based on the current state of the SC, the slice engine may generate a predicted failure state of the SC. In one or more embodiments, among a list of failure states, the predicted failure state may have the highest likelihood to become the predicted failure state.

In one or more embodiments, the slice engine may use the Markov chain model to predict a failure state of the SC. For example, consider a scenario in which at t0, a fan failure (state S1) alert is reported for SC 1. A state path for SC 1 specifies that the fan failure caused the following events in order: (i) fan failure, (ii) overheating of SC 1 (state S2), (iii) SC 1 failure, and (iv) system crash (state S5). At t0, another fan failure alert is reported for SC 2. A state path for SC 2 specifies that the fan failure caused the following events in order: (i) fan failure and (ii) 10% degradation in SC 2's performance (state S3).

At t1, another fan failure alert is reported for SC 3. A state path for SC 3 specifies that the fan failure caused the following events in order: (i) fan failure and (ii) 10% degradation in SC 3's performance. Next, at t1, another fan failure alert is reported for SC 1. A state path for SC 1 specifies that the fan failure caused the following events in order: (i) fan failure, (ii) memory module failure (state S4), and (iii) system crash.

Further, at t2, another fan failure alert is reported for SC 3. A state path for SC 3 specifies that the fan failure caused the following events in order: (i) fan failure and (ii) 10% degradation in SC 3's performance.

At t3, another fan failure alert is reported for SC 1. A state path for SC 1 specifies that the fan failure caused the following events in order: (i) fan failure and (ii) system crash. At t4, another fan failure alert is reported for SC 2. A state path for SC 2 specifies that the fan failure caused the following events in order: (i) fan failure and (ii) 10% degradation in SC 2's performance.

In one or more embodiments of the invention, a transition count of S1 to subsequent states (e.g., S2-S5) are: (i) S1→S1 is zero, (ii) S1→S2 is one, (iii) S1→S3 is four, (iv) S1→S4 is one, and (v) S1→S5 is one.

In one or more embodiments of the invention, the probability of S1→S2 may be defined as $S12/S1$, in which the S1 is $S11+S12+S13+S14+S15$. Based on the above-discussed transition count of S1 to the subsequent states, the following probabilities are obtained: (i) $S12/S1$ is 1/7, (ii) $S13/S1$ is 4/7, (iii) $S14/S1$ is 1/7, and (iv) $S15/S1$ is 1/7.

Based on the above-discussed probabilities, "10% degradation in the SC's performance" is the predicted failure state of the SC.

The aforementioned example is not intended to limit the scope of the invention.

In Step 310, the slice engine may obtain a confidence level of a predicted failure state of the SC. In one or more embodiments, the slice engine may obtain the confidence level of the predicted failure state using a conformal prediction model (e.g., a Mondrian conformal prediction model).

In one or more embodiments of the invention, the conformal prediction model may randomly split predicted failure state data into three sets, for example: (i) a training set, (ii) a calibration set, and (iii) a testing set. To classify and to execute a regression analysis on the training set, the conformal prediction model may implement a supervised ML algorithm (e.g., a Random Forest (RF) algorithm). The conformal prediction model may then calculate conformity measure of the training set using predicted probabilities generated by the RF algorithm.

Thereafter, the conformal prediction model may generate, by using the calibration set and the predicted probabilities, calibration tables for each predicted failure state of the SC. For example, consider a scenario in which the calibration table for the "overheating of the SC" predicted failure state is:

TABLE 1

| Predicted Failure State | Probability | Rank |
| --- | --- | --- |
| Overheating of the SC | 1 | 0 |
| Overheating of the SC | 1 | 1 |
| Overheating of the SC | 0.62 | 2 |
| Overheating of the SC | 0.61 | 3 |
| Overheating of the SC | 0.6 | 4 |
| Overheating of the SC | 0.59 | 5 |
| Overheating of the SC | 0.58 | 6 |
| Overheating of the SC | 0.57 | 7 |
| Overheating of the SC | 0.56 | 8 |
| Overheating of the SC | 0.53 | 9 |
| Overheating of the SC | 0.52 | 10 |
| Overheating of the SC | 0.51 | 11 |
| Overheating of the SC | 0.5 | 12 |
| Overheating of the SC | 0.45 | 13 |
| Overheating of the SC | 0.4 | 14 |

In Table 1, the probabilities and the rankings of the "overheating of the SC" predicted failure state are shown. The predicted failure state is listed in the first column. The probability of each predicted failure state is listed in the second column. The ranking of each predicted failure state is listed in the third column. The conformal prediction model ranks each predicted failure state based on each predicted failure state's probability.

As yet another example, consider a scenario in which the calibration table for the "10% performance degradation" predicted failure state is:

TABLE 2

| Predicted Failure State | Probability | Rank |
| --- | --- | --- |
| 10% performance degradation | 0.87 | 0 |
| 10% performance degradation | 0.67 | 1 |
| 10% performance degradation | 0.62 | 2 |
| 10% performance degradation | 0.5 | 3 |
| 10% performance degradation | 0.45 | 4 |

In Table 2, the probabilities and the rankings of the "10% performance degradation" predicted failure state are shown. The predicted failure state is listed in the first column. The probability of each predicted failure state is listed in the second column. The ranking of each predicted failure state is listed in the third column. The conformal prediction model ranks each predicted failure state based on each predicted failure state's probability.

In one or more embodiments of the invention, after executing the Markov chain model, assume here that: (i) the probability of the "overheating of the SC" failure state is 0.5 (i.e., prob(overheating of the SC)=0.5) and (ii) the probability of the "10% performance degradation" failure state is 0.5 (i.e., prob(10% performance degradation)=0.5). Based on the Markov chain model-based probabilities, the conformal prediction model may obtain the rank of each predicted failure state from the corresponding table. For example, the conformal prediction model obtains the rank of prob(overheating of the SC) as 12 out of 14 from Table 1 and obtains the rank of prob(10% performance degradation) as 3 out of 4 from Table 2.

In one or more embodiments, based on the rank of each predicted failure state, the conformal prediction model may determine a probability value (e.g., a p-value) of each predicted failure state. The conformal prediction model determines the p-value of a predicted failure state based on the following rule: (the rank of the last item in the table—the rank of the Markov chain model-based probability in the table)/(the total number of ranked items in the table). For example, based on the rule, the conformal prediction model determines p-value(overheating of the SC) as (14−12)/15=0.133 and p-value (10% performance degradation) as (4−3)/5=0.2.

In one or more embodiments, based on the above-discussed p-values, the conformal prediction model picks a target error rate (e.g., a significance level), in which the confidence level is "1-the significance level". If the p-value of a predicted failure state is greater than or equal to the significance level, then the predicted failure state is correct. For example, for an 80% (e.g., 0.8) confidence level, the significance level is 0.2. Based on the significance level, "10% performance degradation" is the correct predicted failure state with an 80% confidence level.

The aforementioned example is not intended to limit the scope of the invention.

Turning now to FIG. 3.2, the method shown in FIG. 3.2 may be executed by, for example, the above-discussed device slice engine, the configuration engine (e.g., 210, FIG. 2.1), and the network function module (e.g., 204, FIG. 2.1). Other components of the system (100) illustrated in FIG. 1 may also execute all or part of the method shown in FIG. 3.2 without departing from the scope of the invention.

In Step 312, the slice engine sends the confidence level of the predicted failure state of the SC to the configuration engine.

In Step 314, a first determination is made about whether a minimum predetermined confidence level threshold is exceeded. If the result of the first determination is NO, the method proceeds to Step 316. If the result of the first determination is YES, the method proceeds to Step 318.

In one or more embodiments of the invention, the configuration engine may execute the first determination by comparing the confidence level of the predicted failure state of the SC against the minimum predetermined confidence level threshold. For example, if the confidence level of the predicted failure state of the SC is 55% and the minimum predetermined confidence level threshold is 50%, the configuration engine determines that the minimum predetermined confidence level threshold is exceeded.

In one or more embodiments of the invention, the configuration engine sends the result of the first determination and one or more configuration instructions to the slice mapper (e.g., 212, FIG. 2.1). In one or more embodiments, for example, because the minimum predetermined confidence level threshold is exceeded, the configuration instructions may specify that the data stored in the SC should be mapped to the high priority network slice.

In Step 316, the configuration engine waits until the confidence level of the predicted failure state of the SC exceeds the minimum predetermined confidence level threshold. For example, if the confidence level of the predicted failure state of the SC is 20% and the minimum predetermined confidence level threshold is 50%, the configuration engine waits until the confidence level of the predicted failure state of the SC exceeds 50%. In one or more embodiments, if the user does not want to take a risk of losing the data stored in the SC, the user may set the minimum predetermined confidence level threshold to a lower level (e.g., 15%).

In Step 318, as a result of the first determination in Step 314 being YES, a second determination is made about whether a high priority network slice exists. If the result of the second determination is NO, the method proceeds to Step 320. If the result of the second determination is YES, the method proceeds to Step 322.

In one or more embodiments of the invention, the slice engine may execute the second determination by sending an inquiry to the slice mapper. In response to the inquiry, the slice mapper sends a response to the slice engine. The response may include, but is not limited to: a name of each network slice available in a network, a type of each network slice available in a network, etc. Based on the response, the slice mapper may request the generation of a high priority network slice from the network function module (e.g., 204, FIG. 2.1).

In Step 320, based on receiving the request, the network function module may generate the high priority network slice.

Turning now to FIG. 3.3, the method shown in FIG. 3.3 may be executed by, for example, the above-discussed slice engine, the slice mapper, and the network function module. Other components of the system (100) illustrated in FIG. 1 may also execute all or part of the method shown in FIG. 3.3 without departing from the scope of the invention.

In Step 322, the slice engine sends a request to the source device to obtain the data stored in the SC. Based on receiving the request from the slice engine, the source device may allow the slice engine to obtain the data stored in the SC.

In Step 324, the slice engine may request mapping of the data stored in the SC to the high priority network slice from the slice mapper. In one or more embodiments, the slice engine sends the data stored in the SC to the slice mapper. Based on the result of the first determination (executed in Step 314) and the configuration instructions received from the configuration engine, the slice mapper may map the data stored in the SC to the high priority network slice.

In Step 326, the network function module may reorder data in the high priority network slice based on the data stored in the SC. In one or more embodiments, the network function module may reorder the data in the high priority network slice to prioritize the data stored in the SC. Without reordering, a layout of the high priority network slice may not accurately reflect the priority of each data in the high priority network slice.

In Step 328, a third determination is made about whether a prerequisite data should be migrated. If the result of the third determination is NO, the method proceeds to Step 330. If the result of the third determination is YES, the method proceeds to Step 334.

In one or more embodiments of the invention, the slice engine may execute the third determination by analyzing application metadata of one or more applications. The slice engine may obtain the application metadata from the source device. Based on the application metadata, the slice engine may determine that the data stored in the SC depends on data (referred to as "prerequisite data") stored in another SC of the source device. For this reason, the slice mapper may first map the prerequisite data to the high priority network slice. The slice mapper may then map the data stored in the SC to the high priority network slice.

In Step 330, the slice engine may migrate, via the high priority network slice, the data stored in the SC to the target device (e.g., 106, FIG. 1) (see, e.g., FIGS. 4.1-4.3). In one or more embodiments, the target device may store the data in one or more SCs located in the target device.

In Step 332, the slice engine may notify, via the GUI, the user of the source device about the completion of the migration.

In one or more embodiments of the invention, the method may end following Step 332.

In Step 334, as a result of the third determination in Step 328 being YES, the slice engine sends a request to the source device to obtain the prerequisite data from a corresponding SC of the source device. Based on receiving the request from the slice engine, the source device may allow the slice engine to obtain the prerequisite data from the corresponding SC.

In one or more embodiments, the corresponding SC is an SC that is different from the SC that stores the data. In one or more embodiments, the corresponding SC may include the prerequisite data and second data, in which the second data may not be migrated to the target device when the prerequisite data is migrated.

In Step 336, the slice engine sends the prerequisite data and the result of the third determination (executed in Step 328) to the slice mapper. Based on the result of the third determination, the slice mapper may map the prerequisite data to the high priority network slice.

Turning now to FIG. 3.4, the method shown in FIG. 3.4 may be executed by, for example, the above-discussed slice engine and the network function module. Other components of the system (100) illustrated in FIG. 1 may also execute all or part of the method shown in FIG. 3.4 without departing from the scope of the invention.

In Step 338, the network function module may prioritize the prerequisite data in the high priority network slice. In this manner, the prerequisite data may set to be migrated to the target device prior to the data stored in the SC.

In Step 340, the slice engine may migrate, via the high priority network slice, the prerequisite data and the data stored in the SC to the target device. In one or more embodiments, the target device may store the prerequisite data and the data stored in the SC in one or more SCs located in the target device.

In Step 342, similar to Step 332 of FIG. 3.3, the slice engine may notify, via the GUI, the user of the source device about completion of the migration.

In one or more embodiments of the invention, the method may end following Step 342.

Turning now to FIG. 3.5, the method shown in FIG. 3.5 may be executed by, for example, the above-discussed slice engine. Other components of the system (100) illustrated in FIG. 1 may also execute all or part of the method shown in FIG. 3.5 without departing from the scope of the invention. As discussed above, the method shown in FIGS. 3.5-3.6 may be performed concurrently with the method shown in FIGS. 3.1-3.4.

In Step 344, the slice engine may obtain system logs and alerts from the source device. In one or more embodiments, the system logs and the alerts may specify at least one state transition of the PC. For example, the state transition of the PC may specify: operational PC→fan failure→overheating of PC→PC failure.

In Step 346, similar to Step 304 of FIG. 3.1, the slice engine may use the normalization and filtering module to process and extract PC-related data from the system logs and the alerts. Said another way, the normalization and filtering module may analyze the system logs and the alerts in order to extract data that is relevant to (related to or associated with) one or more PCs, this data may be referred to as "PC-related data". Based on the example discussed above in Step 344, the PC-related data may specify how the operational PC state of the PC is transitioned into the overheating of PC state.

In Step 348, based on the PC-related data, the slice engine may obtain a current state of the PC. Based on the example discussed above in Step 344, the current state of the PC may be the overheating of PC state. In one or more embodiments, the current state of the PC may be the state where a PC failure was reported.

In Step 350, similar to Step 308 of FIG. 3.1, based on the current state of the PC, the slice engine may generate a predicted failure state of the PC. In one or more embodiments, the slice engine may use the Markov chain model to predict a failure state of the PC. Based on the example discussed above in Step 308 of FIG. 3.1, "overheating of PC" may be the predicted failure state of the PC.

In Step 352, similar to Step 310 of FIG. 3.1, the slice engine may obtain a confidence level of a predicted failure state of the PC. In one or more embodiments, the slice engine may obtain the confidence level of the predicted failure state using the Mondrian conformal prediction model. For example, the slice engine may obtain the confidence level of the "overheating of PC" predicted failure state as 80%.

In Step 354, similar to Step 312 of FIG. 3.2, the slice engine sends the confidence level of the predicted failure state of the PC to the configuration engine.

In Step 356, a fourth determination is made about whether a maximum predetermined confidence level threshold is exceeded. If the result of the fourth determination is NO, the method proceeds to Step 358. If the result of the first determination is YES, the method proceeds to Step 360.

In one or more embodiments of the invention, the configuration engine may execute the fourth determination by comparing the confidence level of the predicted failure state of the PC against the maximum predetermined confidence level threshold. For example, if the confidence level of the predicted failure state of the PC is 80% and the maximum predetermined confidence level threshold is 70%, the configuration engine determines that the maximum predetermined confidence level threshold is exceeded.

In one or more embodiments of the invention, the configuration engine sends the result of the fourth determination and one or more configuration instructions to the slice mapper. In one or more embodiments, for example, because the maximum predetermined confidence level threshold is exceeded, the configuration instructions may specify that non-migrated data stored in the source device should be mapped to the high priority network slice.

In Step 358, the configuration engine waits until the confidence level of the predicted failure state of the PC exceeds the maximum predetermined confidence level threshold. For example, if the confidence level of the predicted failure state of the PC is 60% and the maximum predetermined confidence level threshold is 70%, the configuration engine waits until the confidence level of the predicted failure state of the PC exceeds 70%. In one or more embodiments, if the user does not want to take a risk of losing the non-migrated data stored in the source device, the user may set the maximum predetermined confidence level threshold to a lower level (e.g., 55%).

In Step 360, the slice engine sends a request to the source device to obtain the non-migrated data. Based on receiving the request from the slice engine, the source device may allow the slice engine to obtain the non-migrated data.

In Step 362, the slice engine may request mapping of the non-migrated data to the high priority network slice from the slice mapper. In one or more embodiments, the slice engine sends the non-migrated data to the slice mapper. Based on the result of the fourth determination (executed in Step 356) and the configuration instructions received from the configuration engine, the slice mapper may map the non-migrated data to the high priority network slice.

In one or more embodiments, based on the size of the non-migrated data, the slice mapper may request generation of additional high priority network slices from the network function module. In response to the request, the network function module may generate additional high priority network slices. In this manner, the non-migrated data may be migrated faster to the target device.

In Step 364, the slice engine may migrate, via the high priority network slice, the non-migrated data to the target device (see, e.g., FIGS. 4.5 and 4.6). In one or more embodiments, the target device may store the non-migrated data in one or more SCs located in the target device.

In Step 366, similar to Step 332 of FIG. 3.3, the slice engine may notify, via the GUI, the user of the source device about the completion of the migration.

In one or more embodiments of the invention, the method may end following Step 366.

Start of Example

The following section describes an example of one or more embodiments. The example, illustrated in FIGS. 4.1-4.6, is not intended to limit the scope of the embodiments disclosed herein and is independent from any other examples discussed in this application.

Turning to the example, consider a scenario in which three SCs (e.g., SC 1, SC 2, and SC 3) and a PC are deployed into an example source device (400), and three SCs (e.g., SC 11, SC 12, and SC 13) are deployed into an example target device (402). Initially, FIG. 4.1 shows a diagram of the example source device (400) and the example target device (402). For the sake of brevity, not all components of the example source device (400) and the example target device (402) may be illustrated in FIG. 4.1.

Assume here that: (i) SC 1 includes data 1, (ii) SC 2 includes data 2, (iii) SC 3 includes data 3, (iv) SC 11 includes data 11, (v) SC 12 includes data 12, and (vi) SC 13 includes data 13. Further, assume here that: (i) a confidence level of a predicted failure state of SC 1 is 55%, (ii) a confidence level of a predicted failure state of SC 2 is 15%, (iii) a confidence level of a predicted failure state of SC 3 is 35%, (iv) a confidence level of a predicted failure state of PC is 35%, and (v) a minimum predetermined confidence level threshold is 50%.

At this time, all six SCs are directed (e.g., instructed) to store the above-mentioned data to provide services to the users and/or administrators.

Turning now to FIG. 4.2, FIG. 4.2 shows a diagram of the example source device (400) and the example target device (402) at a later point in time. The configuration engine (not shown) obtains the confidence level of the predicted failure state of each SC in the example source device (400). After obtaining, the configuration engine makes a determination that the confidence level of the predicted failure state of SC 1 exceeds the minimum predetermined confidence level threshold. More specifically, the configuration engine has determined that SC 1's confidence level of the predicted failure state of 55% is above the minimum predetermined confidence level threshold of 50%.

Based on the determination made by the configuration engine and based on one or more configuration instructions of the configuration engine, the slice mapper (not shown) maps data 1 to a high priority network slice. Thereafter, the slice engine (not shown) migrates, via the high priority network slice, data 1 from SC 1 to SC 11.

At this time, all SCs (except SC 1) are directed to store the same data to provide services to the users and/or administrators.

Turning now to FIG. 4.3, FIG. 4.3 shows a diagram of the example source device (400) and the example target device (402) at yet a later point in time. Following the determination made by the configuration engine in FIG. 4.2, data 1 is migrated from SC 1 to SC 11. At this time, in response to the migration process: (i) SC 1 is labeled as failed and (ii) SC 11 is directed to store data 1 and data 11 to provide services to the users and/or administrators. The remaining SCs are still directed to store the same data to provide services to the users and/or administrators.

Turning now to FIG. 4.4, FIG. 4.4 shows a diagram of the example source device (400) and the example target device (402) at yet a later point in time. The configuration engine obtains the confidence level of the predicted failure state of PC in the example source device (400). After obtaining, the configuration engine makes a second determination that the confidence level of the predicted failure state of PC exceeds the maximum predetermined confidence level threshold. More specifically, the configuration engine has determined that the PC's confidence level of the predicted failure state of 80% is above the maximum predetermined confidence level threshold of 70%. Those skilled in the art will appreciate that the PCs and SCs may have the same or different predetermined confidence level thresholds without departing from the invention.

At this time, all five SCs are directed to store the above-mentioned data to provide services to the users and/or administrators.

Turning now to FIG. 4.5, FIG. 4.5 shows a diagram of the example source device (400) and the example target device (402) at yet a later point in time. Following the second determination made by the configuration engine in FIG. 4.4 and based on one or more configuration instructions of the configuration engine, the slice mapper maps data 2 and data 3 to the high priority network slice. Thereafter, the slice engine migrates, via the high priority network slice, data 2 from SC 2 to SC 12 and data 3 from SC 3 to SC 13.

At this time, all SCs (except SC 2 and SC 3) are still directed to store the same data to provide services to the users and/or administrators.

Turning now to FIG. 4.6, FIG. 4.6 shows a diagram of the example source device (400) and the example target device (402) at yet a later point in time. Following the second determination made by the configuration engine in FIG. 4.4, data 2 is migrated from SC 2 to SC 12 and data 3 is migrated from SC 3 to SC 13. At this time, in response to the migration process: (i) PC is labeled as failed, (ii) SC 12 is directed to store data 2 and data 12, and (iii) SC 13 is directed to store data 3 and data 13 to provide services to the users and/or administrators. SC 11 is still directed to store data 1 and data 11 to provide services to the users and/or administrators.

End of Example

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a LAN, a WAN, such as the Internet, mobile network, or any other type of network) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data migration, the method comprising:

obtaining a confidence level of a predicted failure state of a storage component (SC) of a source device;
making a first determination that the confidence level of the predicted failure state of the SC exceeds a minimum predetermined confidence level threshold;
making, based on the first determination, a second determination that a high priority network slice of a network exists;
mapping, based on the second determination, data stored in the SC to the high priority network slice;
migrating the data to a target device via the high priority network slice;
after migrating the data to the target device:
obtaining a confidence level of a predicted failure state of a processing component (PC);
making a third determination that the confidence level of the predicted failure state of the PC exceeds a maximum predetermined confidence level threshold;
mapping, based on the third determination, non-migrated data stored in the source device to the high priority network slice; and
migrating the non-migrated data to the target device via the high priority network slice.

2. The method of claim 1, further comprising:
using a normalization and filtering module to process and extract relevant data from system logs and alerts for the SC;
obtaining a current state of the SC based on the relevant data; and
generating the predicting failure state of the SC based on the current state of the SC.

3. The method of claim 2, wherein the alerts are defined by a vendor of the SC.

4. The method of claim 2, wherein the system logs specify at least one state transition of the SC.

5. The method of claim 1, further comprising:
making a fourth determination that prerequisite data should be migrated, wherein the data is dependent on the prerequisite data; and
mapping the prerequisite data to the high priority network slice, wherein the prerequisite data is set to be migrated to the target device prior to the data.

6. The method of claim 1, wherein the confidence level of the predicted failure state of the SC is determined using a conformal prediction model.

7. The method of claim 1, wherein the network comprises at least the high priority network slice and a low priority network slice.

8. The method of claim 7, wherein a first bandwidth allocated to the high priority network slice is greater than a second bandwidth allocated to the low priority network slice.

9. A non-transitory computer readable medium comprising computer readable program code, which when executed by a computer processor enables the computer processor to perform a method for managing data migration, the method comprising:
obtaining a confidence level of a predicted failure state of a storage component (SC) of a source device;
making a first determination that the confidence level of the predicted failure state of the SC exceeds a minimum predetermined confidence level threshold;
making, based on the first determination, a second determination that a high priority network slice of a network exists;
mapping, based on the second determination, data stored in the SC to the high priority network slice;
migrating the data to a target device via the high priority network slice;
after migrating the data to the target device:
obtaining a confidence level of a predicted failure state of a processing component (PC);
making a third determination that the confidence level of the predicted failure state of the PC exceeds a maximum predetermined confidence level threshold;
mapping, based on the third determination, non-migrated data stored in the source device to the high priority network slice; and
migrating the non-migrated data to the target device via the high priority network slice.

10. The non-transitory computer readable medium of claim 9, further comprising:
using a normalization and filtering module to process and extract relevant data from system logs and alerts for the PC;
obtaining a current state of the PC based on the relevant data; and
generating the predicting failure state of the PC based on the current state of the PC.

11. The non-transitory computer readable medium of claim 10, wherein the alerts are defined by a vendor of the PC.

12. The non-transitory computer readable medium of claim 10, wherein the system logs specify at least one state transition of the PC.

13. The non-transitory computer readable medium of claim 9, further comprising:
making a fourth determination that prerequisite data should be migrated, wherein the data is dependent on the prerequisite data; and
mapping the prerequisite data to the high priority network slice, wherein the prerequisite data is set to be migrated to the target device prior to the data.

14. The non-transitory computer readable medium of claim 9, wherein the confidence level of the predicted failure state of the PC is determined using a conformal prediction model.

15. The non-transitory computer readable medium of claim 9, wherein the network comprises at least the high priority network slice and a low priority network slice.

16. A system for managing data migration, the system comprising:
a processor comprising circuitry;
memory comprising instructions, which when executed perform a method, the method comprising:
obtaining a confidence level of a predicted failure state of a storage component (SC) of a source device;
making a first determination that the confidence level of the predicted failure state of the SC exceeds a minimum predetermined confidence level threshold;
making, based on the first determination, a second determination that a high priority network slice of a network exists;
mapping, based on the second determination, data stored in the SC to the high priority network slice;
migrating the data to a target device via the high priority network slice;
after migrating the data to the target device:
obtaining a confidence level of a predicted failure state of a processing component (PC);
making a third determination that the confidence level of the predicted failure state of the PC exceeds a maximum predetermined confidence level threshold;

mapping, based on the third determination, non-migrated data stored in the source device to the high priority network slice; and
migrating the non-migrated data to the target device via the high priority network slice.

17. The system of claim 16, further comprising:
using a normalization and filtering module to process and extract relevant data from system logs and alerts for the SC;
obtaining a current state of the SC based on the relevant data; and
generating the predicting failure state of the SC based on the current state of the SC.

18. The system of claim 17, wherein the alerts are defined by a vendor of the SC.

19. The system of claim 17, wherein the system logs specify at least one state transition of the SC.

20. The system of claim 16, further comprising:
making a fourth determination that prerequisite data should be migrated, wherein the data is dependent on the prerequisite data; and
mapping the prerequisite data to the high priority network slice, wherein the prerequisite data is set to be migrated to the target device prior to the data.

* * * * *